United States Patent
Linebarger et al.

(10) Patent No.: US 7,123,934 B1
(45) Date of Patent: *Oct. 17, 2006

(54) TELECOMMUNICATIONS OVERLAY SYSTEM

(75) Inventors: John W. Linebarger, Charlotte, NC (US); Durga P. Satapathy, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 819 days.

This patent is subject to a terminal disclaimer.

(21) Appl. No.: 10/077,149

(22) Filed: Feb. 15, 2002

(51) Int. Cl.
*H04Q 7/20* (2006.01)
(52) U.S. Cl. .................. 455/552.1; 455/168.1
(58) Field of Classification Search ......... 455/443, 455/444, 446, 447, 449, 450, 452.1, 452.2, 455/453, 552.1, 168.1; 370/441, 335, 342, 370/209, 341, 328, 338
See application file for complete search history.

(56) References Cited

U.S. PATENT DOCUMENTS

| | | | |
|---|---|---|---|
| 5,497,505 A | 3/1996 | Koohgoll et al. | |
| 6,091,955 A | 7/2000 | Aalto et al. | |
| 6,285,669 B1 | 9/2001 | Gutierrez | |
| 6,405,046 B1 | 6/2002 | Kumaran et al. | |
| 6,510,147 B1 | 1/2003 | Sun et al. | |
| 6,778,517 B1 * | 8/2004 | Lou et al. | 370/338 |
| 2003/0185163 A1 * | 10/2003 | Bertonis et al. | 370/315 |

* cited by examiner

*Primary Examiner*—Jean Gelin

(57) ABSTRACT

A system and method for overlaying signals comprises an incumbent system, an overlay system, and a multi-access controller. The incumbent system is configured to format a first signal according to a protocol used with an incumbent protocol, such as a protocol used with a hybrid fiber coaxial (HFC) system, and transmits the formatted first signal as an incumbent signal to the controller. The overlay system is configured to format a second signal according to a protocol used for an overlay protocol, such as a protocol used with a code division multiple access (CDMA) system, and transmits the formatted second signal to the controller as an overlay signal. The controller overlays the incumbent signal with the overlay signal to create a wireline complementary signal and transmits the wireline complementary signal via a network. Other access signals may be mixed with the complementary signal, such as by the controller, to create a mixed complementary signal.

101 Claims, 6 Drawing Sheets

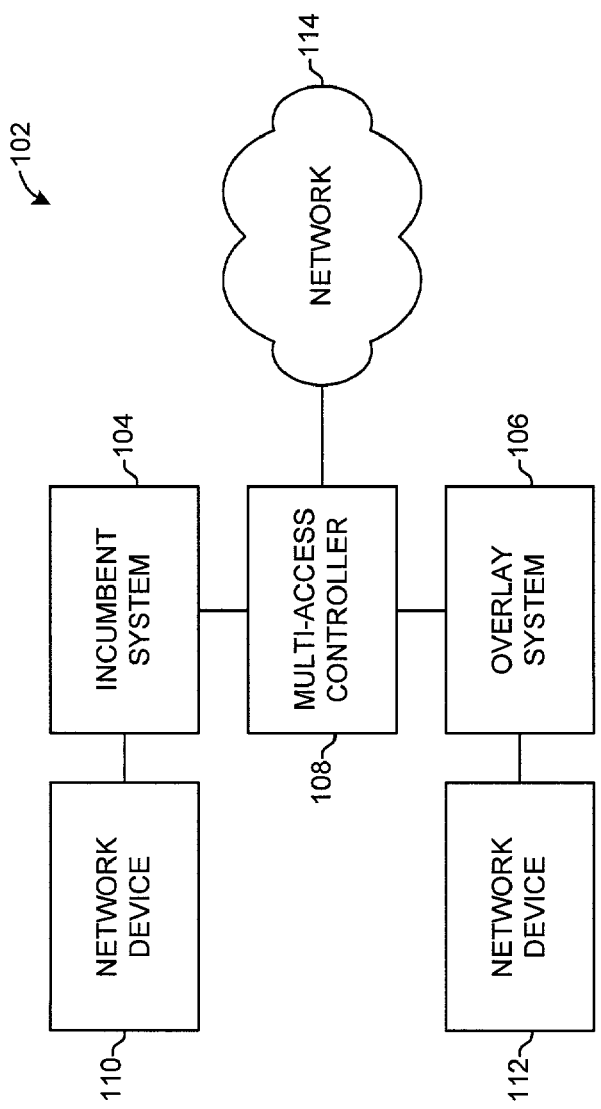
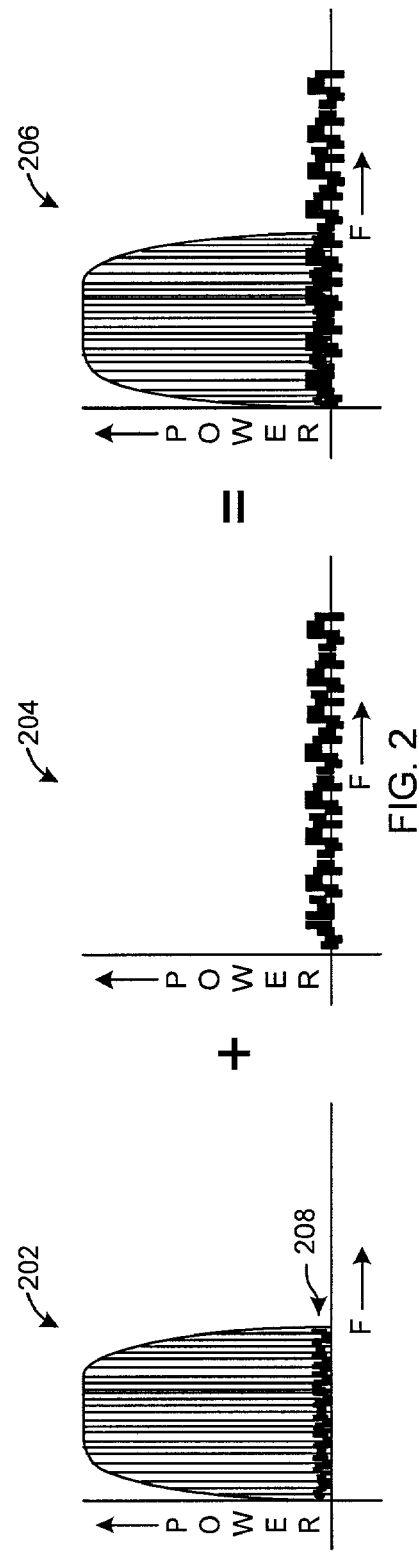

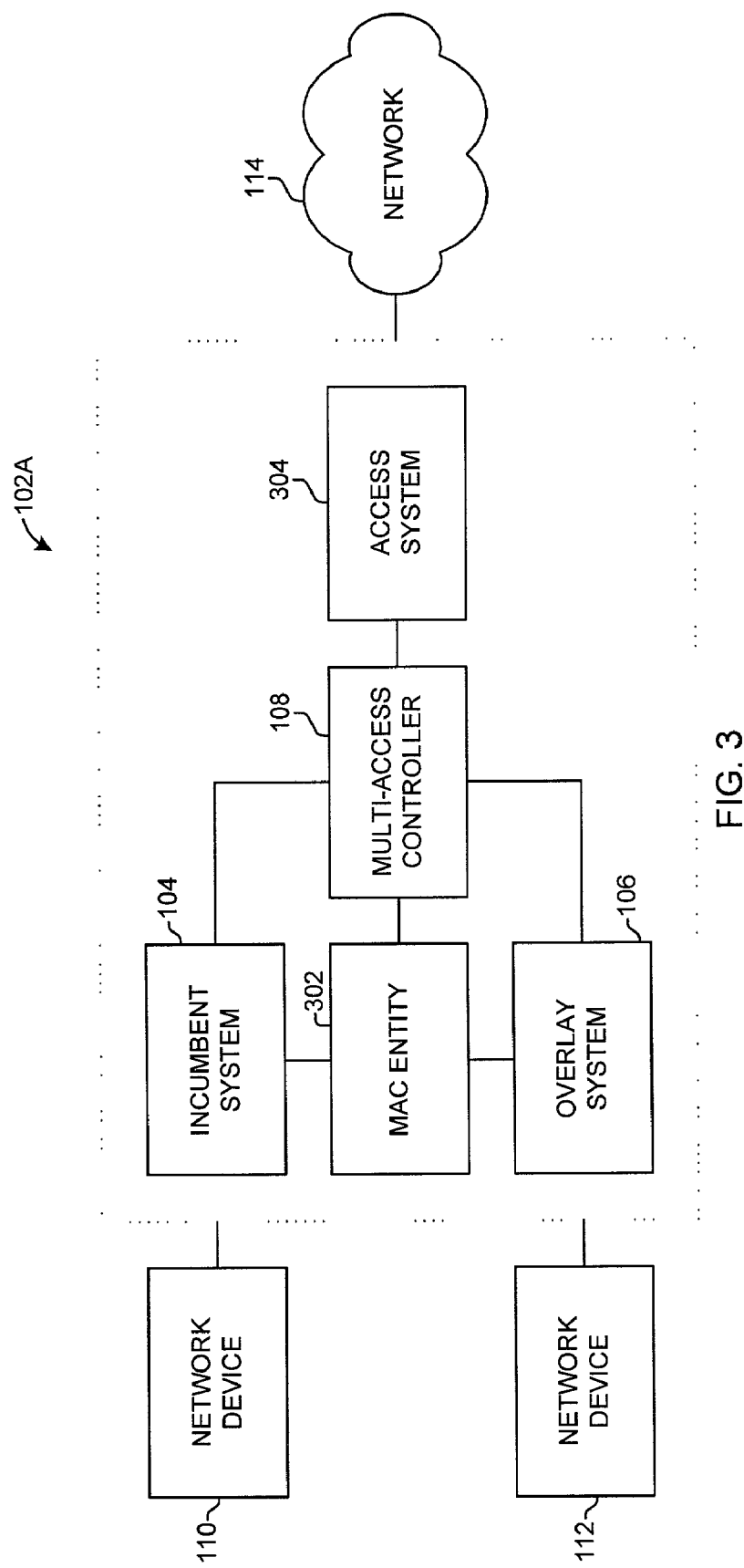

TELECOMMUNICATIONS OVERLAY SYSTEM

RELATED APPLICATIONS

The present application is related to co-pending and commonly owned U.S. patent application Ser. No. 10/017,929, entitled Wireless Telecommunications Overlay System, filed on Oct. 30, 2001.

FEDERALLY SPONSORED RESEARCH OR DEVELOPMENT

Not Applicable

MICROFICHE APPENDIX

Not Applicable

FIELD OF THE INVENTION

The present invention relates to the fields of hybrid fiber coaxial systems and spread spectrum communications.

BACKGROUND OF THE INVENTION

Hybrid fiber coaxial (HFC) networks employ fiber optic and coaxial cable to carry signals throughout the network. Typically, fiber is deployed as the backbone distribution medium from a headend to a fiber node, and coax cable extends from the fiber node to a terminating network device.

HFC networks divide the total bandwidth into a downstream band and an upstream band. The downstream band typically occupies 50–860 megahertz (MHz), and the upstream band typically occupies between 5–47 MHz.

HFC networks typically are able to deliver many types of signals, including plain old telephone service (POTS), analog channels, digital channels, digital point-cast channels, high speed, two way digital links, and other signals. HFC networks may be used, for example, by cable television providers, internet service providers, telephone service providers, and other communication systems providers.

HFC networks traditionally have been limited in capacity due to unknown and unpredictable interference from both natural and manmade sources, such as radio waves, engines, and other sources. In particular, the 5–20 MHz upstream bandwidth is severely underused in currently deployed networks. The upstream channel allocations from 5 MHz to 20 MHz are so severely impacted by interference that the upstream bandwidth traditionally has been limited to status monitoring and control signaling.

HFC networks have inadequate security features. In addition, quality of service (QoS) is a problem with traditional HFC networks.

A new communication system is needed that makes better use of available spectrum in an HFC network. A new communication system is needed to increase capacity and throughput and to increase service deployment and QoS concerns. The system and method of the present invention increase capacity and throughput and improve service deployment, security, and QoS concerns in a single communication system.

SUMMARY OF THE INVENTION

In one aspect, the present invention is directed to a system for generating a complementary signal. The system comprises an incumbent system configured to format a first signal according to an incumbent protocol and an overlay system configured to format a second signal according to an overlay protocol. A controller is configured to overlay the first signal with the second signal to create the complementary signal and to transmit the complementary signal as a wireline signal.

In another aspect, the present invention is directed to a system for generating a complementary signal. The system comprises an incumbent system configured to format a first signal according to an incumbent protocol at a first transmission level and to generate the formatted first signal as an incumbent signal. The system includes an overlay system configured to format a second signal according to an overlay protocol at a second transmission level and to generate the formatted second signal as an overlay signal. The system also has a controller configured to overlay the incumbent signal with the overlay signal to create a wireline complementary signal and to transmit the wireline complementary signal. The system further includes a MAC entity configured to determine the first transmission level for the incumbent signal and the second transmission level for the overlay signal. The first transmission level is complementary to the second transmission level.

In still another aspect, the present invention is directed to a system for receiving a complementary signal. The system comprises a controller configured to receive a wireline complementary signal and to transmit the wireline complementary signal, the wireline complementary signal comprising an incumbent signal portion and an overlay signal portion. The system includes an incumbent system configured to receive the wireline complementary signal from the controller and to demodulate the incumbent signal portion. The system also has an overlay system configured to receive the wireline complementary signal from the controller and to demodulate the overlay signal portion.

In yet another aspect, the present invention is directed to a method for generating a complementary signal. The method comprises formatting a first signal according to an incumbent protocol using an incumbent system and formatting a second signal according to an overlay protocol using an overlay system. The method includes overlaying the first signal with the second signal using a controller to create the complementary signal. The complementary signal is transmitted as a wireline signal.

In a further aspect, the present invention is directed to a method for generating a complementary signal. The method comprises formatting a first signal according to an incumbent protocol at a first transmission level using an incumbent system and generating the formatted first signal as an incumbent signal. A second signal is formatted according to an overlay protocol at a second transmission level using an overlay system, and the formatted second signal is generated as an overlay signal. The incumbent signal is overlayed with the overlay signal to create a wireline complementary signal using a controller, and the wireline complementary signal is transmitted. The first transmission level for the incumbent signal and the second transmission level for the overlay signal are determined using a MAC entity. The first transmission level is complementary to the second transmission level.

In still a further aspect, the present invention is directed to a method for receiving a complementary signal. The method comprises receiving a wireline complementary signal at a controller and transmitting the wireline complementary signal, the wireline complementary signal comprising an incumbent signal portion and an overlay signal portion.

The wireline complementary signal is received from the controller at an incumbent system, and the incumbent signal portion is demodulated. The wireline complementary signal is received from the controller at an overlay system, and the overlay signal portion is demodulated.

BRIEF DESCRIPTION OF THE DRAWINGS

FIG. 1 is a block diagram of a communication system in accordance with an embodiment of the present invention.

FIG. 2 is a diagram of a complementary signal for an incumbent signal and an overlay signal in accordance with an embodiment of the present invention.

FIG. 3 is a block diagram of a communication system depicting a medium access control entity in accordance with an embodiment of the present invention.

DETAILED DESCRIPTION

Figure 4:
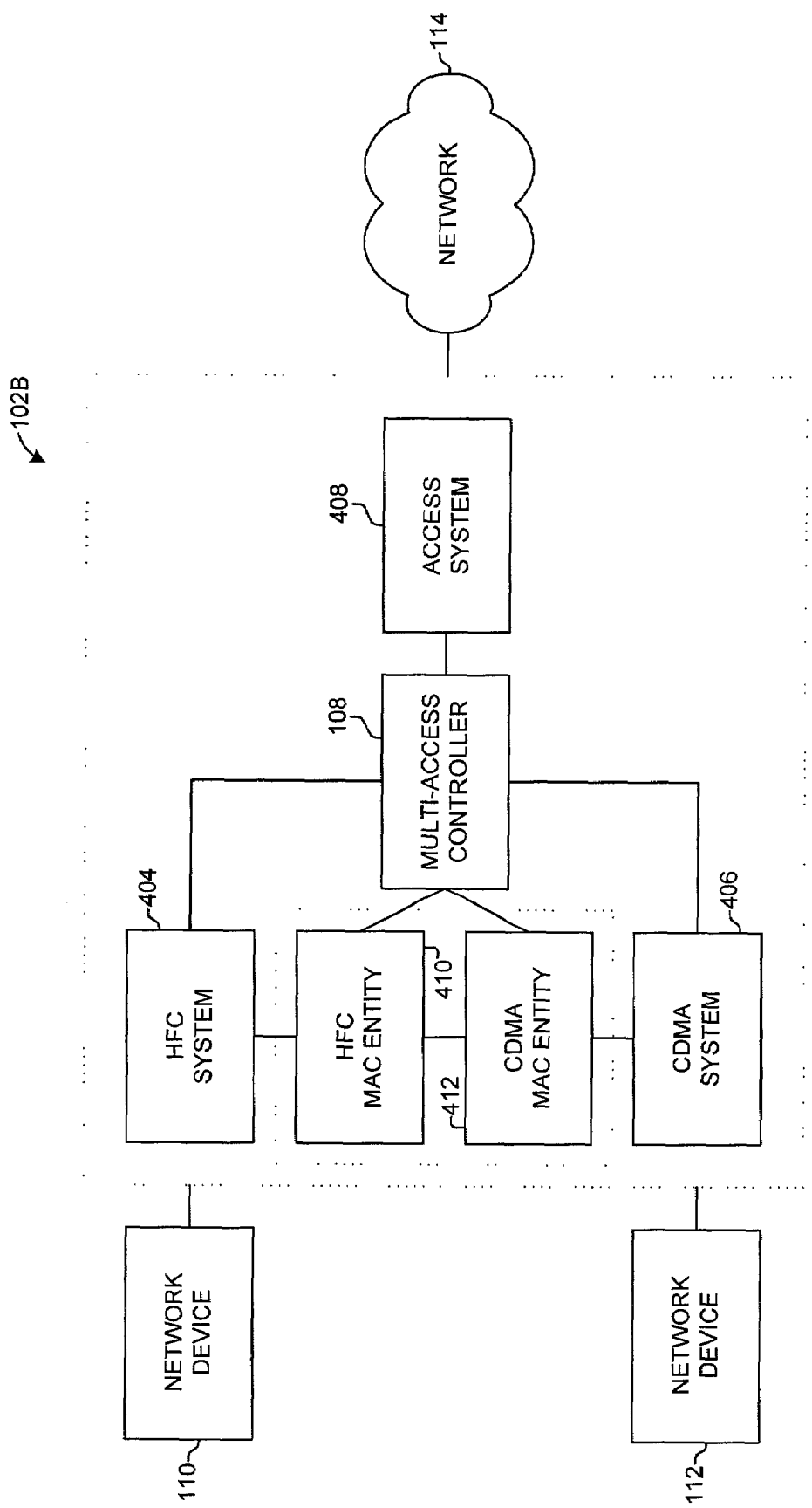
FIG. 4 is a block diagram of a communication system depicting multiple medium access control entities in accordance with an embodiment of the present invention.

Narrowband quadrature amplitude modulation (QAM) and/or quaternary phase shift keying QPSKQAM/QPSK systems, such as hybrid fiber coaxial (HFC) networks, increasingly are being used for delivery of communications. Typically, an HFC network transports communications over fiber from a headend to one or more fiber nodes. The communications then are transported over coaxial cable between the fiber node and the destination.

HFC networks are affected by interference and other problems, causing limitations on the ability to effectively use bandwidth. For example, 5–20 MHz upstream bandwidth is underused due to the vulnerability to interference from environmental factors, such as sub-low frequencies, engines, and other sources. Additionally, the 20–47 MHz upstream bandwidth and the 50–860 MHz downstream bandwidth also are affected by interference. Moreover, HFC networks traditionally are limited by quality of service (QoS) and a lack of viable security processes. Thus, capacity, security concerns, and QoS concerns affect the ability of providers to effectively use HFC infrastructures.

The present invention uses an overlay of multiple technologies to increase the capacity and effectiveness for communications. Preferably, a wideband system, such as a code division multiple access (CDMA) system, is overlaid onto a carrier system, such as an HFC system. Although, other systems may be used. The two systems dynamically share channels so that the systems retain acceptable performance.

The present invention enables a service provider to build an infrastructure using multiple systems with a reduction of total equipment, such as distribution nodes, fiber nodes, fiber, and coaxial cable, used. Alternately, the present invention enables additional systems to be deployed by a service provider using existing infrastructures.

The present invention makes usable previously unusable spectrum. This spectrum may have been unusable due to noise and other interference. With the present invention, significant spectrum is made available in reverse frequencies, particularly in upstream frequencies. This is more significant within the 5–47 MHz upstream bandwidth. Additionally, significant capacity is made available in the 50–860-MHz downstream bandwidth.

The invention provides significant immunity from noise and other interference in the HFC environment. A result of this is an increase in the usable capacity of deployed and undeployed HFC networks. In addition to enabling greater use of existing bandwidth and infrastructure, the invention also enables the addition of end users for a serving area of a given HFC node without installing more fiber or more HFC nodes.

The system and method of the present invention use spreading techniques to overcome limitations in interference and capacity. Spreading codes, such as those used in the CDMA systems, result in a bandwidth spreading factor that is quite high.

Use of spreading codes for multiple access in the overlay system also enables provision of security and QoS guarantees. For example, individual users, as well as their sessions, can be differentiated by using unique spreading codes and mapping these codes to particular connections.

The present invention facilitates coexistence of different service deployments by the same service provider. Thus, an incumbent system can be used for a first service, and an overlay system can be used for a second service. The invention, therefore, abstracts the design decisions and tradeoffs between phased deployments.

The invention enables sharing of existing HFC infrastructures, either between separate services of the same service provider or between separate service providers. The system and method enable novel applications, such as telephony, to be delivered over existing HFC infrastructures.

Moreover, spectrum use can be increased by using multiple protocols for an incumbent system and an overlay system. In addition, dynamic channel sharing between the incumbent and overlay systems enables greater spectrum use and service deployment.

The overlay system is independent of the incumbent system standards and/or protocols. This enables coexistence of numerous modulation schemes. Thus, for example, either system may use national television standards committee vestigial side band (NTSC VSB), QAM, QPSK, compressed digital video, analog video, and other modulation schemes. In addition, the present system and method enable use of any digital processing, such as encryption, deencryption, compression, decompression, and other processing.

The present invention offers the framework for a new HFC CDMA based standard. CDMA signals can be transmitted separately over HFC networks, separate from QAM/QPSK or other modulation schemes. Under the CDMA over HFC approach, traffic identified by one or more spreading codes can be mapped to connections, such as permanent virtual circuits (PVCs), switched virtual circuits (SVCs), or other connections. Control techniques inherent to spread spectrum systems, such as CDMA systems, can be used to implement variable or fixed data rates required by adding or deleting the number of spreading codes and associated traffic to a given connection, such as to a given PVC or SVC.

The present invention combines signals from an incumbent system with signals from an overlay system, thereby creating a single transmission. The incumbent and overlay signals are set at predefined negotiated transmission levels, including a frequency and power level, so that both the incumbent signal and the overlay signal can be transmitted and received with acceptable performance. For example, an incumbent signal can be overlaid with a CDMA signal so that the incumbent signal can be modulated and demodulated within acceptable noise performance levels of the CDMA signal. The CDMA signal can be spread across a wide spectrum, so that the spreading effect accounts for negligible impact on the incumbent signal and the performance of both systems.

It is feasible to predict and attenuate the potential interference caused by overlay signals on incumbent signals and incumbent signals on overlay signals. This coexistence not only increases the spectral efficiency of scarce spectrum, but it also enables abstraction between service offers by a single service provider.

Preferably, the present invention uses a medium access control (MAC) entity to monitor and control the dynamic channel sharing between the incumbent system and the overlay system. Real time updates and status of ongoing transmissions and resource allocations by the MAC entity help reduce the impact of reaction/response times when detecting if the incumbent system or the overlay system is idle or transmitting at low thresholds and responding by increasing transmission levels for the other system. The MAC entity also may help cooperating entities, for example, in some instances by controlling power usage of each.

The present invention contemplates multiple architectures. For example, a spread spectrum signal, such as a CDMA signal, can be overlaid over an HFC signal. This architecture enables multiple services to be delivered simultaneously using incumbent signals and overlay signals. For example, best effort services can be configured to be transmitted via the incumbent system, and guaranteed services can be configured to be transmitted via the overlay system. Alternately, telephony or internet traffic can be transmitted using the incumbent system, and compressed data can be transmitted using the overlay system. In the absence of traffic from the incumbent system, variable power control mechanisms can be used to dynamically obtain greater capacity for best effort services or to augment services requiring guaranteed capacity for the overlay system. In other architectures, spread spectrum techniques can be used as a standalone HFC solution. In this architecture, the overlay system uses all available resources and is fully abstracted from the incumbent system. For example, the second architecture may consist of using only CDMA signals over the HFC infrastructure.

The present invention uses complimentary signals that intentionally are mixed. Thus, the incumbent signal is complimentary to the overlay signal, and the two signals are overlaid to create a complimentary transmission.

The use of complimentary signals is designed to reduce or eliminate problems with noise and interference that otherwise may exist. For example, the incumbent signal may have a power level and a frequency. In addition, the incumbent signal may have a certain noise level within its power and frequency range. The overlay signal can be overlaid on top of the incumbent signal at a power level and frequency that is above, below, or at the noise level of the incumbent signal, yet at a viable power level and frequency that can be transmitted and received successfully. Because of the spread spectrum techniques, regardless of whether the overlay signal is above, below, or at the noise level of the incumbent signal, the overlay signal can be retrieved.

Preferably, the mixing of the complimentary signals is accomplished by dynamic channel sharing. In one embodiment, the dynamic channel sharing is achieved by sensing the power on channels used by the incumbent system. In one instance, the power sensing is achieved via input from a MAC entity. In another instance, the power sensing is achieved by signal detection hardware.

FIG. 1 depicts an exemplary embodiment of a communication system of the present invention. The communication system 102 of FIG. 1 comprises an incumbent system 104, an overlay system 106, and a multi-access controller 108. The incumbent system 104 and the overlay system 106 may communicate with a network device 110 and 112, respectively. Although, the incumbent system 104 and the overlay system 106 may communicate with the same network device or multiple network devices. The multi-access controller 108 may communicate via a network 114.

The incumbent system 104 may be configured to receive signals from, and transmit signals to, the multi-access controller 108 and the network device 110. When so configured, the incumbent system 104 may receive signals from the network device 110 or 112, format the signals according to a selected protocol, and transmit the formatted signals to the multi-access controller 108. Preferably, the incumbent system 104 is configured to format the signals according to protocols used for HFC systems. The term "HFC system" typically refers to a narrowband QAM/QPSK system. The incumbent system 104 may be configured to encrypt, compress, or otherwise process a signal in accordance with a format or protocol for which the signal will be transmitted to the multi-access controller 108.

Preferably, the incumbent system 104 comprises a modulator configured to modulate the signals to be transmitted to the multi-access controller 108. More preferably, the incumbent system 104 comprises a modulator configured to modulate the signals according to protocols used for HFC systems. These signals may be referred to herein as HFC signals.

The incumbent system 104 may be configured to use a modulation technique. Preferably, the incumbent system 104 is configured to modulate the incumbent signal according to protocols used for HFC systems.

The incumbent system 104 formats signals received from the network device 110 as incumbent signals transmitted to the multi-access controller 108. The incumbent signals each have a transmission level, including a frequency and a power level. The transmission levels may be predefined, negotiated levels. Alternately, the transmission levels may be set and/or changed dynamically according to control signals received by the multi-access controller 108. In either case, the incumbent signals are complementary to the overlay signals. The incumbent signals are formatted according to protocols used with incumbent systems, such as an HFC system. These protocols will be referred to herein as incumbent protocols. Incumbent protocols used for formatting incumbent signals, such as an HFC system, also may be referred to as hybrid incumbent protocols.

The incumbent system 104 also may be configured to receive signals from the multi-access controller 108, process the signals, and transmit the signals to the network device 110. The incumbent system 104 is configured to process the signals to a format receivable by the network device 110 or another device. The incumbent system 104 may be configured to format the signals from a carrier band protocol, such as protocols used for HFC systems, to a format receivable by the network device 110. The incumbent system 104 may be configured to de-encrypt, decompress, or otherwise process the signals so that they are receivable by the network device 110. The incumbent system 104 preferably is configured to receive a complementary signal from the multi-access controller 108 and to format the incumbent signal portion of the complementary signal for reception by a network device.

The incumbent system 104 may comprise a modulator configured to de-modulate signals received from the multi-access controller 108 prior to sending the signals to the network device 110. Preferably, the incumbent system 104 comprises a modulator configured to de-modulate HFC signals so that they are receivable by the network device 110.

The incumbent system 104 may be configured with a variable power control mechanism. For example, the incumbent system 104 may be an HFC system comprising a variable power control mechanism that can be used to dynamically obtain greater capacity for service deployment, such as best effort services or services requiring a minimum guaranteed capacity. In this example, an HFC type incumbent system 104 can dynamically use a given channel of bandwidth when the overlay system 106 is idle and not transmitting overlay signals.

The overlay system 106 may be configured to receive signals from, and transmit signals to, the multi-access controller 108 and the network device 112. When so configured, the overlay system 106 receives signals from the network device 112, formats the signals according to a selected protocol, and transmits the formatted signals to the multi-access controller 108. Preferably, the overlay system 106 is configured to format the signals according to protocols used for CDMA systems. The overlay system 106 may be configured to encrypt, compress, or otherwise process a signal in accordance with a format or protocol for which the signal will be transmitted to the multi-access controller 108.

Preferably, the overlay system 106 comprises a modulator configured to modulate the signals to be transmitted to the multi-access controller 108. More preferably, the overlay system 106 comprises a modulator configured to modulate the signals according to protocols used for CDMA systems.

The overlay system 106 may be configured to use a modulation technique. Preferably, the overlay system 106 is configured to modulate the overlay signal according to protocols used for wideband spread spectrum, such as protocols used for CDMA systems.

The overlay system 106 formats signals received from the network device 112 as overlay signals transmitted to the multi-access controller 108. The overlay signals each have a transmission level, including a frequency and a power level. The transmission levels may be predefined, negotiated levels. Alternately the transmission levels may be set and/or changed dynamically according to control signals received by the multi-access controller 108. In either case, the overlay signals are complementary to the incumbent signals. The overlay signals are formatted according to protocols used with overlay systems, such as a CDMA system, an orthogonal frequency division multiplexing (OFDM) system, and an ultra wide band (UWB) system. These protocols will be referred to herein as overlay protocols. Overlay protocols used for formatting overlay signals for wireline systems, such as a CDMA system, an OFDM system, and a UWB system, also may be referred to as wireline overlay protocols.

The overlay system 106 also may be configured to receive signals from the multi-access controller 108, process the signals, and transmit the signals to the network device 112. The overlay system 106 is configured to process the signals to a format receivable by the network device 112 or another device. The overlay system 106 may be configured to format the signals from a wideband protocol, such as protocols used for CDMA signals, to a format receivable by the network device 112. The overlay system 106 may be configured to de-encrypt, decompress, or otherwise process the signals so that they are receivable by the network device 112. The overlay system 106 preferably is configured to receive a complementary signal from the multi-access controller 108 and to format the overlay signal portion of the complementary signal for reception by a network device.

The overlay system 106 may comprise a modulator configured to de-modulate signals received from the multi-access controller 108 prior to sending the signals to the network device 112. Preferably, the overlay system 106 comprises a modulator configured to de-modulate CDMA signals so that they are receivable by the network device 112.

The overlay system 106 may be configured with a variable power control mechanism. For example, the overlay system 106 may be a CDMA system comprising a variable power control mechanism that can be used to dynamically obtain greater capacity for service deployment, such as best effort services or services requiring a minimum guaranteed capacity. In this example, a CDMA type overlay system 106 can dynamically use a given channel of spectrum when the incumbent system 104 is idle and not transmitting incumbent signals.

The transmission levels of the overlay signals are complementary to the transmission levels of the incumbent signals. The complementary transmission levels result in acceptable interference and performance for both the incumbent signals and the overlay signals, as explained more completely below. The complementary nature of the incumbent signals and the overlay signals enables them to co-exist in the same time and frequency domain.

The multi-access controller 108 may be configured to receive signals from, and/or transmit signals to, the incumbent system 104, the overlay system 106, and/or the network 114. The multi-access controller 108 is configured to receive an incumbent signal from the incumbent system 104 and an overlay signal from the overlay system 106. The multi-access controller 108 overlays the overlay signal on the incumbent signal to create a complementary signal. The multi-access controller 108 also may mix one or more access signals with the incumbent signal and the overlay signal to create a mixed complementary signal. The multi-access controller 108 can overlay the signals using a selected process, method, or mechanism, such as mixing or otherwise combining the signals. The multi-access controller transmits the complementary signal or the mixed complementary signal via the network 114. Preferably, the multi-access controller 108 transmits and receives complementary signals and/or mixed complementary signals over a wireline system, such as an HFC system.

It will be appreciated that the multi-access controller 108 intentionally mixes or otherwise overlays the incumbent signal with the overlay signal to create the complementary signal. This enables the multi-access controller 108 to design around potential interference, using the respective transmission levels of the incumbent signal and the overlay signal to create the complementary signal.

In some instances, the multi-access controller 108 may be configured to format or otherwise process the complementary signal prior to transmitting it via the network 114, either before or after combining the incumbent signal and the overlay signal to create the complementary signal. For example, the multi-access controller 108 may encrypt, compress, or effect signal processing to the complementary signal prior to transmitting the complementary signal via the network 114.

In addition or alternately, the multi-access controller 108 may be configured to receive a complementary signal via the network 114. The multi-access controller 108 may be configured to transmit the complementary signal to the incumbent system 104 and the overlay system 106. In some instances, the multi-access controller 108 may be configured to format or otherwise process the complementary signal prior to transmitting it to the incumbent system 104 and the overlay system 106. For example, the multi-access controller 108 may de-encrypt, decompress, or effect signal processing to the complementary signal prior to transmitting the complementary signal to the incumbent system 104 and the overlay system 106.

In some embodiments, the multi-access controller 108 also may include a multi-access transceiver to separate the incumbent signal and the overlay signal from the complementary signal. The multi-access controller 108 then transmits the incumbent signal to the incumbent system 104 and transmits the overlay signal to the overlay system 106. The multi-access controller 108 can separate the incumbent signal and overlay signal from the complementary signal using a selected method, process, or mechanism, such as de-modulating the complementary signal into the incumbent signal and the overlay signal.

In the embodiments where the multi-access controller 108 includes a multi-access transceiver, it may be configured to receive and transmit signals configured according to a modulation technique, including modulation for protocols used for hybrid fiber systems and wideband systems, such as HFC systems and CDMA systems, respectively. The multi-access controller 108 may be configured to combine and/or split incumbent signals, overlay signals, and complementary signals, each possibly using one or more modulation techniques.

The multi-access controller 108 operates as a central controller and resource allocater. The multi-access controller 108 may be configured to overlay signals having predefined, negotiated transmission levels. Alternately, the multi-access controller can be configured to dynamically determine the transmission levels of one or more incumbent signals and/or overlay signals. Thus, the multi-access controller 108 can be configured to transmit control signals to the incumbent system 104 and the overlay system 106 identifying transmission levels for the respective systems or otherwise control the systems.

The multi-access controller 108 effects dynamic channel sharing between the incumbent system 104 and the overlay system 106. The dynamic channel sharing occurs as a result of overlaying the overlay signals on respective incumbent signals using the complementary transmission levels. This dynamic channel sharing between the incumbent system 104 and the overlay system 106 enables greater use of scarce spectrum, especially by dynamically allocating spectrum use to the overlay system 106 when the spectrum is not used by the incumbent system 104 and/or vice versa. Moreover, this dynamic channel sharing enables dynamic reallocation of spectrum for the incumbent system 104 and the overlay system 106 for best effort services or to augment services requiring a minimum guaranteed capacity.

The multi-access controller 108 determines what resources and transmission levels are used by the incumbent system 104 and the overlay system 106. When the multi-access controller 108 is dynamically allocating resources and transmission levels to the incumbent system 104 and the overlay system 106, the multi-access controller may be configured to use that information to extrapolate and select a desired resource and transmission level so that the signals may be overlaid.

The multi-access controller 108 may be configured to determine what protocols are used when a complementary signal is received, including the transmission levels of the respective incumbent signal, overlay signal, and access signal. The multi-access controller 108 may transmit that information to the incumbent system 104 and/or the overlay system 106.

The multi-access controller 108 may be configured with a mixer, including a coupler and/or a splitter, to mix one or more other signals with the complementary signal or to mix one or more other signals with the incumbent signal and the overlay signal to create the complementary signal. In other embodiments, a mixer may be external to the multi-access controller 108.

In some embodiments, the multi-access controller 108 also may be configured with an optical transmitter and/or an electrical/optical (E/O) converter. In other embodiments, the multi-access controller 108 may be configured with an optical receiver and/or an optical/electrical (O/E) converter in addition to, or instead of, the optical transmitter and/or the electrical/optical (E/O) converter. In still further embodiments, any of the optical transmitter, the electrical/optical (E/O) converter, the optical receiver, and/or the optical/electrical (O/E) converter may be external to the multi-access controller 108.

The multi-access controller 108 may comprise a carrier sensing system (CSS) to dynamically allocate the resources and transmission levels of the incumbent system 104 and the overlay system 106. The CSS determines the resources and transmission levels currently being used by storing or caching the system status, such as frequency, time slot, and power level, for the incumbent system 104 and the overlay system 106. The CSS also may sense and store whether the transmissions are regular or irregular, whether the signals are constant bit rate (CBR) or variable bit rate (VBR), or other characteristics of the signals and performance of the incumbent system 104 and the overlay system 106.

The CSS may comprise signal detection hardware or a medium access control (MAC) entity. Signal detection hardware senses the power levels on signals received from the incumbent system 104 and the overlay system 106 and generates control signals to effect changes or retain the same levels as needed. The MAC entity receives or obtains real time updates of the status of ongoing signals and resource allocations by the incumbent system 104 and the overlay system 106. Use of the MAC entity can reduce the impact of reaction/response times of signal detection hardware.

On the receiving side, the CSS may be configured to determine the transmission levels of the complementary signal. It will be appreciated that the CSS may be configured to use one or more carrier sensing techniques, such as listen before talk or other techniques.

The multi-access controller 108 may be configured to transmit control signals to the incumbent system 104 and the overlay system 106. These control signals identify transmission levels to be used for incumbent signals and overlay signals, respectively. The control signals may require the incumbent system 104 or the overlay system 106 to raise or lower transmission levels or the output of incumbent signals and/or the overlay signals to the multi-access controller 108 based on the output of the opposing incumbent system 104 or overlay system 106, capacity needs, capacity availability, and other factors. Thus, the multi-access controller 108 synchronizes the needs and availabilities of the incumbent system 104 and the overlay system 106 and may use control signals to achieve those ends.

It will be appreciated that, in some embodiments, the multi-access controller 108 may include a transmitter only. In this configuration, the multi-access controller 108 will be able to receive incumbent signals from the incumbent system 104 and overlay signals from the overlay system 106, overlay the signals to create the complementary signal, and transmit the complementary signal via the network 114.

Alternately, in some embodiments, the multi-access controller 108 may include a receiver only. In this configuration, the multi-access controller 108 will be configured to receive a complementary signal via the network 114, transmit the complementary signal to the incumbent system 104, and transmit the complementary signal to the overlay system 106.

The network devices 110 and 112 are devices configured to receive signals from, and/or transmit signals to, the incumbent system 104 and/or the overlay system 106. The network devices 110 and 112 may be, for example, a telephone, a computer, a service hub, a transceiver, or another device configured to transmit signals to, or receive signals from, the incumbent system 104 and/or the overlay system 106.

The network 114 is a network configured to carry signals, such as complementary signals, to and from the multi-access controller 108. The network 114 may include hardware, software, or a combination thereof. For example, the network 114 may include switches, gateways, wireless switches, antennas, receivers, transceivers, and/or other devices configured to handle signals. Preferably, the network 114 is a wireline system configured to carry wireline signals.

FIG. 2 depicts an exemplary embodiment of an incumbent signal, an overlay signal, and a complementary signal. In the embodiment of FIG. 2, an incumbent signal 202 is overlaid with an overlay signal 204 to create a complementary signal 206.

The incumbent signal 202 has a frequency and a power level. In addition, the incumbent signal has a noise level 208. In this example, the incumbent signal is modulated as an HFC signal.

The overlay signal 204 has a frequency and a power level. The power level of the overlay signal 204 can be configured to be above, below, and/or at the noise level 208 of the incumbent signal 202. Because the overlay signal 204 is modulated and demodulated as a wideband signal using spreading codes, it can be decoded at any level above, below, and/or at the noise level 208 of the incumbent signal 202. Moreover, the spreading codes enables the system to differentiate signals based on the particular spreading code. Thus, different services can be identified by the spreading codes, as well as different users. Additionally, use of spreading codes enables security to be maintained at a higher level since signals can be decoded or identified by particular spreading codes. In this example, the overlay signal 204 is a CDMA signal with a power level encompassing than the noise level of the incumbent signal 206.

The spread spectrum characteristics of the CDMA signal, i.e. spreading a narrowband signal over a wideband width, enables the signal to have a power spectral density level in the range of thermal noise spectral density. Thus, when the incumbent signal 202 is overlaid with the overlay signal 204 to create the complementary signal 206, the impact of the spread spectrum CDMA signal to the HFC signal is a negligible rise in the noise level. Since the CDMA signal has a negotiated transmission level, either predefined or specified by a control signal, splitting of the complementary signal by demodulation of the HFC signal portion of the complementary signal and the CDMA signal portion of the complementary signal occurs with acceptable performance. The spreading effect of the CDMA signal accounts for a negligible impact on the HFC signal and a negligible impact of the HFC signal on the CDMA signal.

The complementary nature of the complementary signal 206 can be seen from FIG. 2. Once the overlay signal 204 is combined with the incumbent signal 202, the two signals exist in a single complementary signal 206 in the same time and frequency domain. Thus, the intentional complementary mixing of the two signals results in the dynamic channel sharing between the incumbent system 104 and the overlay system 106.

The system of FIG. 1 operates as follows. In a first example, the incumbent system 104 has primary transmission rights, and the overlay system 106 has secondary rights. The multi-access controller 108 determines the transmission levels of the incumbent signals to be generated by the incumbent system 104. Then, the multi-access controller 108 determines the transmission levels of the overlay signals to be generated by the overlay system 106. In this example, the overlay system 106 is constrained to use transmission levels that result in acceptable interference for the incumbent system 104. The incumbent system 104 and the overlay system 106 then operate at these predefined, negotiated transmission levels.

The network device 110 transmits a signal to the incumbent system 104. The incumbent system 104 modulates the signal according to the transmission levels identified by the multi-access controller 108. The incumbent system 104 then transmits the modulated signal as the incumbent signal to the multi-access controller 108.

The network device 112 transmits a signal to the overlay system 106. The overlay system 106 modulates the signal according to the transmission levels identified by the multi-access controller 108. The incumbent system 106 then transmits the modulated signal as an overlay signal to the multi-access controller 108.

The multi-access controller 108 receives the incumbent signal from the incumbent system 104 and the overlay signal from the overlay system 106. In this example, the multi-access controller 108 mixes the incumbent signal with the overlay signal to create the complementary signal. The multi-access controller 108 then transmits the complementary signal over the network 114.

In this example, the incumbent signal is a narrowband HFC signal and the overlay signal is a wideband signal. Thus, the complementary signal is an overlay of a wideband spread spectrum signal with a narrowband HFC signal.

In another example, the incumbent system 104 is configured to modulate incumbent signals using four CATV channels, each 6 Mhz for a total of 24 MHz spectrum. The overlay system 106 is configured to use 20 MHz CDMA signals. The incumbent system 104 generates incumbent signals to the multi-access controller 108 using the 6 MHz HFC spectrum for each of the four channels. The overlay system 106 generates overlay signals to the multi-access controller 108 using the 20 MHz wideband CDMA signals. The multi-access controller 108 receives the incumbent signals and the overlay signals. The multi-access controller 108 overlays the incumbent signal with the overlay signal, using the remaining 4 MHz for guard channels.

In another example, the incumbent system 104 is configured to modulate incumbent signals using 6 MHz spectrum. The overlay system 106 is configured to use 5 MHz CDMA signals. The incumbent system 104 generates incumbent signals to the multi-access controller 108 using the 6 MHz HFC spectrum. The overlay system 106 generates overlay signals to the multi-access controller 108 using the 5 MHz wideband CDMA signals. The multi-access controller 108 receives the incumbent signals and the overlay signals. The multi-access controller 108 overlays the incumbent signal with the overlay signal, using the remaining 1 MHz for guard channels.

It will be appreciated that other overlay configurations may be used. The above overlay configurations are examples, and other frequencies and configurations may be used.

In another example, the multi-access controller 108 comprises a MAC entity. When the incumbent system 104 modulates a signal to create an incumbent signal, the MAC entity senses the transmission levels of the incumbent signal. Likewise, when the overlay system 106 modulates a signal received from the network device 112 to create an overlay signal, the MAC entity senses the transmission level of the overlay signal. The MAC entity uses the sensed transmission levels of the incumbent signal and overlay signal to confirm that the incumbent system 104 and the overlay system 106 are modulating the respective signals according to the predefined negotiated levels. In addition, the MAC entity uses the sensed transmission levels of the respective signals to mix the incumbent signal and the overlay signal to create the complementary signal.

In another example, the multi-access controller 108 comprises signal detection hardware. When the incumbent system 104 modulates a signal to create an incumbent signal, the signal detection hardware senses the transmission levels of the incumbent signal. Likewise, when the overlay system 106 modulates a signal received from the network device 112 to create an overlay signal, the signal detection hardware senses the transmission level of the overlay signal. The signal detection hardware uses the sensed transmission levels of the incumbent signal and overlay signal to confirm that the incumbent system 104 and the overlay system 106 are modulating the respective signals according to the predefined negotiated levels. In addition, the signal detection hardware uses the sensed transmission levels of the respective signals to mix the incumbent signal and the overlay signal to create the complementary signal.

In another example, the multi-access controller 108 comprises a MAC entity. In this example, the incumbent system 104 and the overlay system 106 provide real time updates of system status when a received signal is modulated or demodulated. Thus, for example, when the incumbent system 104 modulates a signal received from the network device 110 and transmits that modulated signal to the multi-access controller 108, a status signal is transmitted to the MAC entity. Likewise, when the overlay system 106 receives a signal from the network device 112 and modulates the signal to create the overlay signal, the overlay system transmits a status signal to the MAC entity. The status signals identify transmission levels and the overall system status of the incumbent system 104 and/or the overlay system 106, respectively.

In this example, the MAC entity uses the real time status to allocate resources and to identify transmission levels to be used by the incumbent system 104 and the overlay system 106. The MAC entity identifies the power level used by the incumbent system 104 and the power level used by the overlay system 106.

The multi-access controller 108 dynamically allocates the power levels to be used by the incumbent system 104 and the overlay system 106. The multi-access controller 108 entity transmits a control signal to the incumbent system 104 identifying the power level to be used by the incumbent system 104 when modulating a signal to create the incumbent signal. Likewise, the multi-access controller 108 transmits a control signal to the overlay system 106 identifying the power level to be used when modulating the signal received from the network device 112 to create the overlay signal. Thus, the MAC entity dynamically determines the channel sharing for the incumbent system 104 and the overlay system 106.

It will be appreciated that the MAC entity can identify the modulation scheme to be used by either the incumbent system 104 or the overlay system 106. In addition, the MAC entity can identify protocols to be used for a designated spectrum, frequency, power levels, digital processing, and/or whether spectrum is available for use by the incumbent system 104 and/or the overlay system 106. In this example, the MAC entity is configured to raise or lower transmission levels of signals formatted by the incumbent system 104 or the overlay system 106 depending on requirements of the other system. The MAC entity is configured to transmit control signals to the incumbent system 104 or the overlay system 106 to effect that formatting.

In another example, the multi-access controller 108 comprises a MAC entity. However, in this example the incumbent system 104 and the overlay system 106 do not transmit status signals to the MAC entity. Instead, the MAC entity monitors the incumbent system 104 and the overlay system 106. Thus, the MAC entity monitors modulation schemes and their respective transmission levels. The MAC entity then determines whether a modulation scheme, including transmission levels and other signal characteristics, should remain the same or are changed. Thus, the MAC entity dynamically determines the channel sharing for the incumbent system 104 and the overlay system 106.

In another example, the multi-access controller 108 receives a complementary signal. The multi-access controller 108 estimates the transmission levels of the complementary signal. The multi-access controller 108 transmits the complementary signal to the incumbent system 104 and to the overlay system 106.

The incumbent system 104 receives the complementary signal and demodulates the incumbent signal portion to yield a signal receivable by the network device 110. The incumbent system 104 then transmits the signal to the network device 110.

The overlay system 106 receives the complementary signal from the multi-access controller 108 and demodulates the overlay signal portion to yield a format receivable by the network device 112. The overlay system 106 then transmits the signal to the network device 112.

In another example, the multi-access controller 108 comprises a MAC entity. The multi-access controller 108 receives a complementary signal and transmits the complementary signal to the incumbent system 104 and the overlay system 106. In this instance, the multi-access controller 108 does not process the complementary signal.

The incumbent system 104 comprises a demodulator that demodulates the complementary signal. In this example, the incumbent system 104 demodulates only the incumbent signal portion of the complementary signal to yield a signal receivable by the network device 110. The rest of the complementary signal, including the overlay signal portion of the complementary signal, appears to the incumbent system 104 as noise or other interference. In other examples, the incumbent system 104 may otherwise process the signal after it is demodulated, such as with de-encryption or other signal processing.

The overlay system 106 comprises a demodulator that demodulates the complementary signal. In this example, the overlay system 106 demodulates only the overlay signal portion of the complementary signal to yield a signal receivable by the network device 112. The rest of the complementary signal, including the incumbent signal portion of the complementary signal, appears to the overlay system 106 as noise or other interference. In other examples, the overlay system 106 may otherwise process the signal after it is demodulated, such as with de-encryption or other signal processing.

In another example, the multi-access controller 108 comprises a MAC entity. The multi-access controller 108 receives a complementary signal via the network 114. The MAC entity determines the signal characteristics of the complementary signal, including the power level. The multi-access controller 108 transmits the complementary signal to the incumbent system 104 and to the overlay system 106. Additionally, the multi-access controller 108 transmits a control signal to the incumbent system 104 and the overlay system 106 identifying the signal characteristics of the complementary signal.

The incumbent system 104 receives the complementary signal and the control signal. The incumbent system uses the signal characteristics identified by the control signal to format the incumbent signal portion of the complementary signal into a signal receivable by the network device 110. In this example, the incumbent signal portion of the complementary signal is modulated with an incumbent protocol for the HFC spectrum. In other examples, the signal characteristics may identify bandwidth, spreading codes, encryption, compression, or other processing characteristics.

The overlay system 106 receives the complementary signal and the control signal from the multi-access controller 108. The overlay system 106 uses the signal characteristics identified in the control signal to format the overlay signal portion of the complementary signal to a form receivable by the network device 112. In this example, the signal characteristics identify the incumbent signal portion of the complementary signal as having an incumbent protocol for a CDMA signal. In other examples, the signal characteristics may identify bandwidth, spreading codes, encryption, compression, or other processing characteristics.

In another example, the multi-access controller 108 comprises a MAC entity. In this example, the multi-access controller 108 does not transmit control signals to the incumbent system 104 and the overlay system 106. In this example, the MAC entity directly monitors and controls the incumbent system 104 and the overlay system 106.

The multi-access controller 108 receives a complementary signal over the network 114. The multi-access controller 108 transmits the complementary signal to the incumbent system 104 and to the overlay system 106.

The incumbent system 104 receives the complementary signal from the multi-access controller 108. The MAC entity identifies the signal characteristics of the complementary signal. The incumbent system 104 uses the signal characteristics of the complementary signal to format the complementary signal to a format receivable by the network device 110. In this example, the incumbent system 104 demodulates and de-encrypts the complementary signal to a form receivable by the network device 110.

The overlay system 106 receives the complementary signal from the multi-access controller 108. The MAC entity communicates the signal characteristics of the complementary signal to the overlay system 106. The overlay system 106 uses the signal characteristics of the complementary signal to format the overlay signal to a form receivable by the network device 112. In this example, the overlay system 106 demodulates and decompresses the complementary signal consistent with the signal characteristics to a format receivable by the network device 112.

FIG. 3 depicts an exemplary embodiment of another communication system 102A. In the embodiment of FIG. 3, the communication system 102A comprises a MAC entity 302. The communication system 102A may include an optional access system 304 or more than one access systems.

It will be appreciated that the incumbent system 104, the overlay system 106, the multi-access controller 108, and/or the MAC entity 302 may be co-located or distributed. Also, each may include one or more software or hardware components. For example, they may be in a single service hub or other device, or one or more components may be distributed in one or more separate devices. Moreover, as depicted in FIG. 3, the network device 110, the network device 112, and the network 114 may communicate with any of the incumbent system 104, the overlay system 106, and the multi-access controller 108. Moreover, other network devices may be included in the communication system 102A, or one or more of the network devices 110 or 112 may be eliminated from the communication system. The same is true for the communication system 102 of FIG. 1.

In the embodiment of FIG. 3, the multi-access controller 108 also is configured to receive signals from, and to transmit signals to, the access system 304. In some embodiments, the multi-access controller 108 is configured to overlay an incumbent signal with an overlay signal to create a complementary signal and then to mix the complementary signal with an access signal to create a mixed complementary signal. In other embodiments, the multi-access controller 108 is configured to overlay the incumbent signal with the overlay signal while modulating the access signal to create the mixed complementary signal. Similarly, the multi-access controller 108 may be configured to split a mixed complementary signal to a complementary signal and an access signal and to transmit the access signal to the access system 304, and to transmit the complementary signal to the incumbent system 104 and the overlay system 106. In other embodiments, the multi-access controller 108 may be configured to transmit the complementary signal to the incumbent system 104, the overlay system 106, and the access system 304.

The MAC entity 302 monitors reception and transmission of signals to and from each of the incumbent system 104, the overlay system 106, and the multi-access controller 108. The MAC entity 302 monitors the signal characteristics of each signal transmitted or received. The signal characteristics may include bandwidth, spreading codes, modulation schemes, transmission levels, protocol formatting, and signal processing, such as encryption, de-encryption, compression, decompression, and other processing techniques. For example, the MAC entity 302 monitors and senses received power on signals received from the incumbent system 104 at the multi-access controller 108, signals received from the overlay system 106 at the multi-access controller, and signals received from the network 114 or other network device at the multi-access controller.

The MAC entity 302 may be configured to directly monitor and control signal characteristics, such as bandwidth, spreading codes, modulation schemes and transmission levels, of signals formatted at the incumbent system 104 and the overlay system 106. Alternately, the MAC entity 302 may be configured to transmit control signals to the incumbent system 104 or the overlay system 106. In addition, the MAC entity 302 may be configured to communicate monitored status or received status signals to the multi-access controller 108, and the multi-access controller 108 then may be configured to transmit control signals to the incumbent system 104 and the overlay system 106 or otherwise provide control.

The monitoring and control of the MAC entity 302 enables the multi-access controller 108 to combine incumbent signals and overlay signals and to identify signal characteristics for formatting received complementary signals. The MAC entity 302 generates real time status information of the incumbent system 104 and the overlay system 106 to the multi-access controller 108, either through direct communication or transmission and reception of status signals. Thus, the MAC entity 302 enables the multi-access controller 108 to dynamically control channel sharing on a real time basis.

In the embodiment of FIG. 3, the MAC entity 302 is depicted as separate from the multi-access controller 108. However, FIG. 3 depicts logical components for ease of understanding. The MAC entity 302 may be a part of the multi-access controller 108 or separate from the multi-access controller. Likewise, the MAC entity 302 may have multiple sub-MAC entities included in one or more of the incumbent system 104 and the overlay system 106.

The access system 304 receives access signals from external sources and transmits the access signals to the multi-access controller 108. The access system 304 also receives signals from the multi-access access controller 108 and transmits the access signal to the external device, such as another network device. The access system 304 may be configured to demodulate the access signal portion of the complementary signal, split the access signal portion from a mixed complementary signal, or receive and transmit an access signal, depending on the embodiment.

The access system 304 may include a digital video system, a cable modem system, an NTSC modulator, or another system that can be mixed with the complementary signal. The access system 304 may be configured to modulate a signal, such as with an NTSC modulator or another modulator. The access system 304 also may be configured to digitally receive and transmit an access signal, such as with a cable modem. For example, the access system 304 may transmit digital video over the cable modem.

The access system 304 may be configured to generate an access signal that is to be mixed with the complementary signal in one embodiment to result in another complementary signal, which may be referred to alternately as the mixed complementary signal. In this embodiment, the complementary signal remains. In this embodiment, the mixed signal may be split from the complementary signal. In another embodiment, the incumbent signal and the overlay signal are mixed with the access signal to create the complementary signal, which may be referred to alternately as the mixed complementary signal. In this embodiment, the access signal may be split from the complementary signal, and the complementary signal may be de-modulated to recover the incumbent signal and the overlay signal.

The communication system 102A of FIG. 3 operates as follows. In a first example, the MAC entity 302 is a part of the multi-access controller 108. The network device 110 transmits a signal that is received by the overlay system 106, and the network device 112 transmits a signal that is received by the incumbent system 104. In this example, the network devices 110 and 112 are not directly connected to either of the incumbent system 104 or the overlay system 106, and intervening devices may route the signals to the respective incumbent system and overlay system. In this example, the signal from the network device 110 is a voice telephone call, and the signal from the network device 112 is multi-media Internet Protocol (IP) connection.

In this example, the protocols with which the signals are to be formatted, including their modulation schemes, are predefined and negotiated for each of the incumbent system 104 and the overlay system 106. The incumbent system 104 receives the signal generated from the network device 112, formats the signal according to an incumbent protocol to create an incumbent signal, and transmits the incumbent signal to the multi-access controller 108. The overlay system 106 receives the signal generated from the network device 110, formats the signal according to an overlay protocol to create an overlay signal, and transmits the overlay signal to the multi-access controller 108.

While the incumbent system 104 and the overlay system 106 are creating the respective incumbent signal and overlay signal, the MAC entity 302 monitors the incumbent system and overlay system to determine the signal characteristics of the incumbent signal and the overlay signal and to determine whether or not the incumbent system and overlay system are formatting signals according to the predefined negotiated levels for each system to create the respective incumbent signal and overlay signal. The MAC entity 302 passes the status to the multi-access controller 108. In this example, the status includes the system status of each of the incumbent system 104 and the overlay system 106 and the signal characteristics of each of the incumbent signal and the overlay signal.

The multi-access controller 108 receives the incumbent signal and the overlay signal and the status from the MAC entity. The multi-access controller 108 overlays the incumbent signal with the overlay signal to create a complementary signal. The multi-access controller 108 then transmits the complementary signal. In this example, the complementary signal is transmitted to the network 114.

In another example, the MAC entity 302 is separate from the multi-access controller 108. The MAC entity 302 communicates with the incumbent system 104, the overlay system 106, and the multi-access controller 108. The MAC entity 302 receives status signals from the incumbent system 104 and the overlay system 106. In this example, the status signals comprise system status and signal characteristics. In other examples, the status signals may include only the system status, only the signal characteristics, or other information. Additionally, in this example, the MAC entity 302 receives instructions from the multi-access controller 108 and generates instructions to the incumbent system 104 and the overlay system 106 based on those instructions. In other examples, the multi-access controller 108 generates control signals directly to the incumbent system 104 and the overlay system 106.

The MAC entity 302 receives a status signal from the incumbent system 104 and the overlay system 106. The MAC entity transmits the system status to the multi-access controller 108. The multi-access controller 108 determines that the power levels of the incumbent system 104 and the overlay system 106 should be modified. The multi-access controller 108 transmits the information identifying the power level for the incumbent system 104 and the power level for the overlay system 106 to the MAC entity 302. The MAC entity 302 transmits a control signal to the incumbent system 104 identifying the power level to be used for future incumbent signals. The MAC entity 302 also transmits a control signal to the overlay system 106 identifying the power levels to be used for future overlay signals.

The incumbent system 104 receives a signal and modulates the signal according to the power levels identified in the control signal from the MAC entity 302. The incumbent system 104 then transmits the modulated signal as an incumbent signal to the multi-access controller 108. The incumbent system 104 also transmits a status signal to the MAC entity 302 identifying the transmission levels of the incumbent signal, including the power level.

The overlay system 106 receives a signal and modulates the signal according to the power level identified in the control signal from the MAC entity 302. The overlay system 106 transmits the modulated signal as an overlay signal to the multi-access controller 108. Additionally, the overlay system 106 transmits a status signal to the MAC entity 302 identifying the transmission levels used for the overlay signal, including the power level.

The MAC entity 302 receives the status signal from the incumbent system 104 and the overlay system 106. The MAC entity 302 transmits the status to the multi-access controller 108.

The multi-access controller receives the incumbent signal, the overlay signal, and the status from the MAC entity 302. The multi-access controller 108 determines that the correct transmission levels were used for the modulation of the incumbent signal and overlay signal. The multi-access controller 108 mixes the incumbent signal and the overlay signal to create the complementary signal. The multi-access controller 108 transmits the complementary signal.

In another example, the overlay system 106 receives multiple signals for guaranteed services. The incumbent system 104 receives multiple signals for best effect services. The MAC entity 302 monitors both the incumbent system 104 and the overlay system 106 and determines that the overlay system received signals for guaranteed services. The MAC entity 302 instructs the multi-access controller 108 that signals for guaranteed services were received by the overlay system 106 and signals for best effort services were received by the incumbent system 104.

The multi-access controller 108 instructs the overlay system 106 to modulate the signals for transmission. The overlay system 106 modulates the signals, and transmits the signals to the multi-access controller 108. The multi-access controller overlays the signals as complementary signals for transmission.

In another example, the multi-access controller 108 receives a signal from the network 114. The MAC entity 302 monitors the signal and determines that it is a complementary signal. The MAC entity 302 determines the signal characteristics of the complementary signal and communicates the signal characteristics to the incumbent system 104 and the overlay system 106. The multi-access controller 108 also transmits the complementary signal to the incumbent system 104 and to the overlay system 106. In this example the MAC entity 302 is a part of the multi-access controller 108.

In another example, the access system 304 exists in the communication system 102A. The incumbent system 104 receives a signal from the network device 112. The incumbent system 104 modulates the signal to create an incumbent signal and transmits the incumbent signal to the multi-access controller 108. The overlay system 106 receives a signal from the network device 110. The overlay system 106 modulates the signal to create an overlay signal and transmits the incumbent signal to the multi-access controller 108. Additionally, the access system 304 receives a signal from another source. In this example, the access system 304 is configured to modulate the signal as an NTSC signal. The access system 304 modulates the signal to create the access signal and transmits the access signal to the multi-access controller 108.

The multi-access controller 108 overlays the incumbent and overlay signals to create the complementary signal. Additionally, the multi-access controller 108 mixes the access signal with the complementary signal to create the mixed complementary signal for transmission. The multi-access controller 108 converts the mixed complementary signal to an optical format and transmits it via an optical transmitter. In this embodiment, the multi-access controller 108 contains an E/O converter and an optical transmitter. In other embodiments, the E/O converter and optical transmitter are external to the multi-access controller 108.

In another example, the access system 304 exists in the communication system 102A. The incumbent system 104 receives a signal from the network device 110. The incumbent system 104 modulates the signal to create an incumbent signal and transmits the incumbent signal to the multi-access controller 108. The overlay system 106 receives a signal from the network device 112. The overlay system 106 modulates the signal to create an overlay signal and transmits the incumbent signal to the multi-access controller 108. Additionally, the access system 304 receives a signal from another source, such as another network device. In this example, the access signal is a digital signal from a cable modem. The access device 304 transmits the access signal to the multi-access controller 108.

The multi-access controller 108 overlays the incumbent and overlay signals to create the complementary signal. Additionally, the multi-access controller 108 mixes the access signal with the complementary signal to create the mixed complementary signal for transmission. The multi-access controller 108 converts the mixed complementary signal to an optical format and transmits it via an optical transmitter. In this embodiment, the multi-access controller 108 contains an E/O converter and an optical transmitter. In other embodiments, the E/O converter and optical transmitter are external to the multi-access controller 108.

In another example, the multi-access controller 108 receives a mixed complementary signal via an optical receiver. The multi-access controller 108 converts the mixed complementary signal to an electrical format using an O/E converter. The multi-access controller 108 splits the mixed complementary signal into an access signal and a complementary signal. The multi-access controller 108 transmits the access signal to the access system 304 and transmits the complementary signal to the incumbent system 104 and the overlay system 106.

The incumbent system 104 receives the complementary signal and de-modulates the incumbent signal portion. The incumbent system 104 then transmits the incumbent signal portion to the network device 110.

The overlay system 106 receives the complementary signal and de-modulates the overlay signal portion. The overlay system 106 then transmits the overlay signal portion to the network device 112.

The access system 304 receives the access signal from the multi-access controller 108. The access system 304 demodulates the access signal for an NTSC format and transmits the access signal to another network device.

In this embodiment, the multi-access controller 108 contains an E/O converter and an optical transmitter. In other embodiments, the E/O converter and optical transmitter are external to the multi-access controller 108.

In still another example, the multi-access controller 108 receives a mixed complementary signal via an optical receiver. The multi-access controller 108 converts the mixed complementary signal to an electrical format using an O/E converter. The multi-access controller 108 splits the mixed complementary signal into an access signal and a complementary signal. The multi-access controller 108 transmits the access signal to the access system 304 and transmits the complementary signal to the incumbent system 104 and the overlay system 106.

The incumbent system 104 receives the complementary signal and de-modulates the incumbent signal portion. The incumbent system 104 then transmits the incumbent signal portion to the network device 110.

The overlay system 106 receives the complementary signal and de-modulates the overlay signal portion. The overlay system 106 then transmits the overlay signal portion to the network device 112.

The access system 304 receives the access signal from the multi-access controller 108. The access system 304 transmits the access signal to another network device. In this example, the access signal is a cable modem signal carrying digital video.

In yet example, the multi-access controller 108 receives a mixed complementary signal via an optical receiver. The multi-access controller 108 converts the mixed complementary signal to an electrical format using an O/E converter. The multi-access controller 108 transmits the complementary signal to the incumbent system 104, the overlay system 106, and the access system 304.

The incumbent system 104 receives the complementary signal and de-modulates the incumbent signal portion. The incumbent system 104 then transmits the incumbent signal portion to the network device 110.

The overlay system 106 receives the complementary signal and de-modulates the overlay signal portion. The overlay system 106 then transmits the overlay signal portion to the network device 112.

The access system 304 receives the complementary signal and de-modulates the access signal portion. The access system 304 transmits the access signal to another network device.

In another example, the MAC entity 302 communicates with the incumbent system 104, the overlay system 106, the multi-access controller 108, and the access system 304. The MAC entity 302 receives status signals from the incumbent system 104, the overlay system 106, and the access system 304. In this example, the status signals comprise system status and signal characteristics. In other examples, the status signals may include only the system status, only the signal characteristics, or other information. Additionally, in this example, the MAC entity 302 receives instructions from the multi-access controller 108 and generates instructions to the incumbent system 104, the overlay system 106, and the access system 304 based on those instructions. In other examples, the multi-access controller 108 generates control signals directly to the incumbent system 104, the overlay system 106, and the access system 304.

The MAC entity 302 receives a status signal from the incumbent system 104, the overlay system 106, and the access system 304. The MAC entity transmits the system status to the multi-access controller 108. The multi-access controller 108 determines that the power levels of the incumbent system 104, the overlay system 106, and the access system 304 should be modified. The multi-access controller 108 transmits the information identifying the power level for the incumbent system 104, the power level for the overlay system 106, and the power level for the access system 304 to the MAC entity 302. The MAC entity 302 transmits a control signal to the incumbent system 104 identifying the power level to be used for future incumbent signals. The MAC entity 302 also transmits a control signal to the overlay system 106 identifying the power levels to be used for future overlay signals. The MAC entity 302 also transmits a control signal to the access system 304 identifying the power levels to be used for future access signals.

The incumbent system 104 receives a signal and modulates the signal according to the power levels identified in the control signal from the MAC entity 302. The incumbent system 104 then transmits the modulated signal as an incumbent signal to the multi-access controller 108. The incumbent system 104 also transmits a status signal to the MAC entity 302 identifying the transmission levels of the incumbent signal, including the power level.

The overlay system 106 receives a signal and modulates the signal according to the power level identified in the control signal from the MAC entity 302. The overlay system 106 transmits the modulated signal as an overlay signal to the multi-access controller 108. Additionally, the overlay system 106 transmits a status signal to the MAC entity 302 identifying the transmission levels used for the overlay signal, including the power level.

The access system 304 receives a signal and modulates the signal according to the power level identified in the control signal from the MAC entity 302. The access system 304 transmits the modulated signal as an access signal to the multi-access controller 108. Additionally, the access system 304 transmits a status signal to the MAC entity 302 identifying the transmission levels used for the access signal, including the power level.

The MAC entity 302 receives the status signal from the incumbent system 104, the overlay system 106, and the access system 304. The MAC entity 302 transmits the status to the multi-access controller 108.

The multi-access controller receives the incumbent signal, the overlay signal, the access signal, and the status from the MAC entity 302. The multi-access controller 108 determines that the correct transmission levels were used for the modulation of the incumbent signal, the overlay signal, and the access signal. The multi-access controller 108 mixes the incumbent signal, the overlay signal, and the access signal to create the complementary signal. The multi-access controller 108 transmits the complementary signal. In another example, the multi-access controller 108 mixes the incumbent signal and the overlay signal to create the complementary signal, and then mixes the access signal with the complementary signal.

In another example, the multi-access controller 108 receives a signal from the network 114. The MAC entity 302 monitors the signal and determines that it is a complementary signal. The MAC entity 302 determines the signal characteristics of the complementary signal and communicates the signal characteristics to the incumbent system 104, the overlay system 106, and the access system 304. The multi-access controller 108 also transmits the complementary signal to the incumbent system 104, the overlay system 106, and the access system 304. In this example the MAC entity 302 is a part of the multi-access controller 108.

In another example, the multi-access controller 108 receives a signal from the network 114. The MAC entity 302 monitors the signal and determines that it is a complementary signal. The MAC entity 302 determines the signal characteristics of the complementary signal and communicates the signal characteristics to the incumbent system 104, the overlay system 106, and the access system 304. The multi-access controller 108 splits the complementary signal to the access signal portion and the complementary signal, transmits the access signal portion to the access system 304, and transmits the complementary signal to the incumbent system 104 and the overlay system 106. In this example the MAC entity 302 is a part of the multi-access controller 108.

FIG. 4 depicts an exemplary embodiment of a communication system 102B with multiple MAC entities. The communication system 102B comprises a multi-access controller 108 in communication with an HFC system 404, a CDMA system 406, and an access system 408. In this example, the MAC entity 302A comprises an HFC MAC entity 410 and a CDMA MAC entity 412. In the embodiment of FIG. 4, the access system 408 does not have a separate associated MAC entity. However, in other embodiments, an access system MAC entity may be included.

The HFC system 404 formats signals to be transmitted for protocols used with HFC signals. These will be referred to herein as HFC protocols. Preferably, the HFC system 404 comprises a modulator configured to modulate signals to be transmitted according to required transmission levels. For the purposes of simplicity, the HFC system 404 will be identified as generating incumbent signals. However, it will be appreciated that the HFC system 404 can be configured as an overlay system in other configurations.

The CDMA system 406 formats signals to be transmitted according to protocols used with CDMA signals. For simplicity, these protocols will be referred to herein as CDMA protocols. Preferably, the CDMA system 406 comprises a modulator configured to modulate signals to be transmitted according to required transmission levels. For simplicity, the CDMA system 406 will be referred to as generating overlay signals. However, the CDMA system 406 can be referred to as an incumbent system in other embodiments.

The access system 408 formats signals to be transmitted according to protocols used with access signals. For simplicity, these protocols will be referred to herein as access protocols. In some embodiments, the access system 408 comprises a modulator configured to modulate signals to be transmitted according to required transmission levels. For example, the access system 408 may include a modulator to modulate and/or demodulate signals for a cable modem or an NTSC modulator. For simplicity, the access system 408 will be referred to as generating access signals.

The HFC MAC entity 410 monitors signals received at, and transmitted from, the HFC system 404. The HFC MAC entity 410 transmits status to the multi-access controller 108 and the CDMA MAC entity 412 and receives status information from the CDMA MAC entity. Further, the HFC MAC entity 410 receives control instructions from the multi-access controller 108.

The HFC MAC entity 410 transmits control instructions to the HFC system 404. Preferably, the HFC MAC entity 410 is configured in the HFC system 404. Alternately, the HFC MAC entity 410 may be configured as a part of the multi-access controller 108 or as a separate MAC entity 302A separate from the HFC system 404 and separate from the multi-access controller 108.

The CDMA MAC entity 412 monitors signals received at, and transmitted from, the CDMA system 406. The CDMA MAC entity 412 transmits status to the multi-access controller 108 and the HFC MAC entity 410 and receives status information from the HFC MAC entity. Further, the CDMA MAC entity 412 receives control instructions from the multi-access controller 108.

The CDMA MAC entity 412 transmits control instructions to the CDMA system 406. Preferably, the CDMA MAC entity 412 is configured in the CDMA system 406. Alternately, the CDMA MAC entity 412 may be configured as a part of the multi-access controller 108 or as a separate MAC entity 302A separate from the CDMA system 406 and separate from the multi-access controller 108.

In the embodiment of FIG. 4, the HFC MAC entity 410 and the CDMA MAC entity 412 interface with each other and transmit status signals to each other. Likewise, the HFC MAC entity 410 and the CDMA MAC entity 412 are in constant communication with the multi-access controller 108. In this manner, the multi-access controller 108, the HFC MAC entity 410, and the CDMA MAC entity 412 operate together to determine and control signal formatting, including modulation and selection of transmission levels, for the HFC system 404 and the CDMA system 406. If an access system MAC entity was present, it would operate and communicate in a similar manner.

The system in FIG. 4 operates as follows. In a first example, the HFC system 404 receives a first signal, and the CDMA system 406 receives a second signal. In this example, the transmission levels for incumbent signals and overlay signals are predefined negotiated levels.

The HFC system 404 modulates the signals to be transmitted according to an HFC protocol to create an incumbent signal. The HFC system 404 transmits the incumbent signal to the multi-access controller 108. Concurrently, the HFC MAC entity 410 monitors the modulation of the first signal by the HFC system 404 to the incumbent signal. The HFC MAC entity 410 transmits a status signal to the multi-access controller 108 identifying the signal characteristics of the incumbent signal, including the transmission levels.

The CMDA system 406 receives a second signal and modulates the second signal according to a CDMA protocol to create an overlay signal. The CDMA system 406 transmits the overlay signal to the multi-access controller 108. Concurrently, the CDMA MAC entity 412 monitors the modulation of the first signal to create the incumbent signal. The CDMA MAC entity 412 transmits a status signal to the multi-access controller 108 identifying the signal characteristics of the overlay signal, including the transmission levels.

In this example, the HFC MAC entity 410 and the CDMA MAC entity 412 communicate with each other. Each transmits a status signal to the other identifying the signal characteristics of the respective incumbent signal and overlay signal.

The multi-access controller 108 receives the incumbent signal, the overlay signal, and the status signals. The multi-access controller 108 determines that the transmission levels of the incumbent signal and overlay signal are correct and overlays the incumbent signal with the overlay signal to create a complementary signal.

In another example, the multi-access controller 108 receives an incumbent signal from the HFC system 404, an overlay signal from the CDMA system 406, and an access signal from the access system 408. The multi-access controller 108 also receives a status signal from the HFC MAC entity 410 and the CMDA MAC entity 412. The multi-access controller 108 determines that the power level used by the CDMA system 406 is not correct and transmits a control signal to the CDMA system requesting that the power level be changed and that the overlay signal be retransmitted to the multi-access controller. The CDMA system 406 reformats its received signal to create another overlay signal according to the correct transmission level. The CDMA system 406 then transmits the new overlay signal to the multi-access controller 108.

It will be appreciated that other examples exist. However, one skilled in the art can use the examples of operation described with respect to FIGS. 1 through 4 to determine alternative examples and operations for each of the embodiments.

Figure 5:
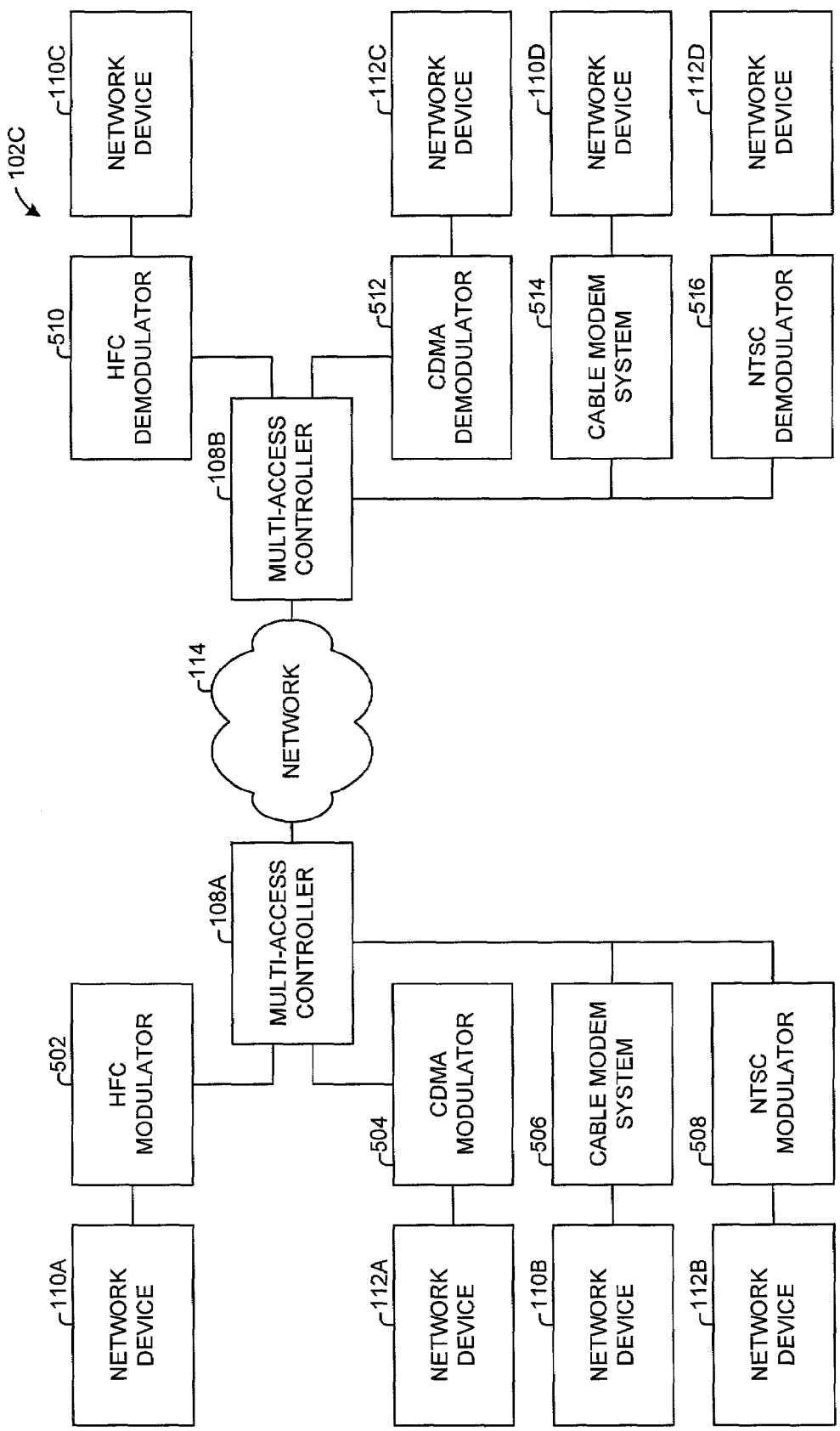
FIG. 5 is a block diagram of a communication system having an integrated transmitter and an integrated receiver in accordance with an embodiment of the present invention.

FIG. 5 depicts an exemplary embodiment of a communication system 102C identifying separate transmitters and receivers. The embodiment of FIG. 5 depicts downstream communications. The upstream portion of the communication system 102C comprises an HFC modulator 502, a CDMA modulator 504, a cable modem system 506, an NTSC modulator 508, and a multi-access controller 108A. The downstream portion of the communication system 102C comprises an HFC demodulator 510, a CDMA demodulator 512, a cable modem system 514, an NTSC demodulator 516, and a multi-access controller 108B.

The HFC modulator 502 receives signals from the network device 110A and modulates the signals according to protocols used with an HFC system. The HFC modulator 502 then transmits the HFC modulated signals to the multi-access controller 108A as incumbent signals. The HFC modulator 502 may be configured to provide other signal processing. (Actually, HFC implies a cable modem, and what we mean here by use of HFC is a narrowband QAM/QPSK system, so maybe we should just use QAM/QPSK instead of HFC in both text and figure? The same issue arises later in other figures and text with HFC. As HFC has been used in many places, maybe another way would be to just mention somewhere in the beginning that the use of HFC system refers to a narrowband QAM/QPSK system . . . .)

The CDMA modulator 504 receives signals from the network device 112A and modulates the signals according to protocols used for CDMA signals. The CDMA modulator 504 transmits the CDMA modulated signals to the multi-access controller 108A as overlay signals. The CDMA modulator 504 may be configured to provide other signal processing.

The cable modem system 506 receives signals from the network device 110B and modulates the signals, when necessary, according to protocols used for cable modem signals. The cable modem system 506 transmits the cable modem signals to the multi-access controller 108A as access signals. The cable modem system 506 may be configured to provide other signal processing.

The NTSC modulator 508 receives signals from the network device 112B and modulates the signals according to protocols used for NTSC signals. The NTSC modulator 508 transmits the modulated signals to the multi-access controller 108A as access signals. The NTSC modulator 508 may be configured to provide other signal processing.

The multi-access controller 108A comprises only the upstream portion of the multi-access controller 108 described above. (See FIG. 1) The multi-access controller 108A overlays the incumbent signals with overlay signals as described above to create complementary signals. The multi-access controller 108A further mixes the access signals from the cable modem system 506 and the NTSC modulator 508 with the complementary signal to create mixed complementary signals. The multi-access controller transmits mixed complementary signals over the network 114 as described above. In other embodiments, the multi-access controller 108A mixes the incumbent signal, the overlay signal, and access signals from the cable modem system 506 and the NTSC modulator 508 to create mixed complementary signals The multi-access controller 108B comprises only the downstream portion of the multi-access controller 108 described above. (See FIG. 1) The multi-access controller 108B receives a mixed complementary signal. The multi-access controller 108B splits the mixed complementary signal into the respective access signals and the complementary signal. The multi-access controller 108B then transmits the complementary signal to the HFC demodulator 510 and the CDMA demodulator 512 and transmits the respective access signals to the cable modem system 514 and the NTSC demodulator 516. In other embodiments, the multi-access controller 108B does not split the mixed complementary signal. Instead, the multi-access controller 108B transmits the mixed complementary signal to the HFC demodulator 510, the CDMA demodulator 512, the cable modem system 514, and the NTSC demodulator 516.

The HFC demodulator 510 receives the complementary signal from the multi-access controller 108B, demodulates the complementary signal according to protocols used for an HFC signal demodulation, and transmits the demodulated signal to the network device 110C. The HFC demodulator 510 may be configured to provide other signal processing.

The CDMA demodulator 512 receives the complementary signal from the multi-access controller 108B, demodulates the complementary signal according to protocols used for CDMA signal, and transmits the demodulated signal to the network device 112C. The CDMA demodulator 512 may be configured to provide other signal processing.

The cable modem system 514 receives the cable modem access signal from the multi-access controller 108B, demodulates the complementary signal according to protocols used for cable modem signals, when necessary, and transmits the access signal to the network device 112D. The cable modem system 514 may be configured to provide other signal processing.

The NTSC demodulator 516 receives the NTSC access signal from the multi-access controller 108B, demodulates the access signal according to protocols used for NTSC signals, and transmits the access signal to the network device 112D. The NTSC demodulator 516 may be configured to provide other signal processing.

Figure 6:
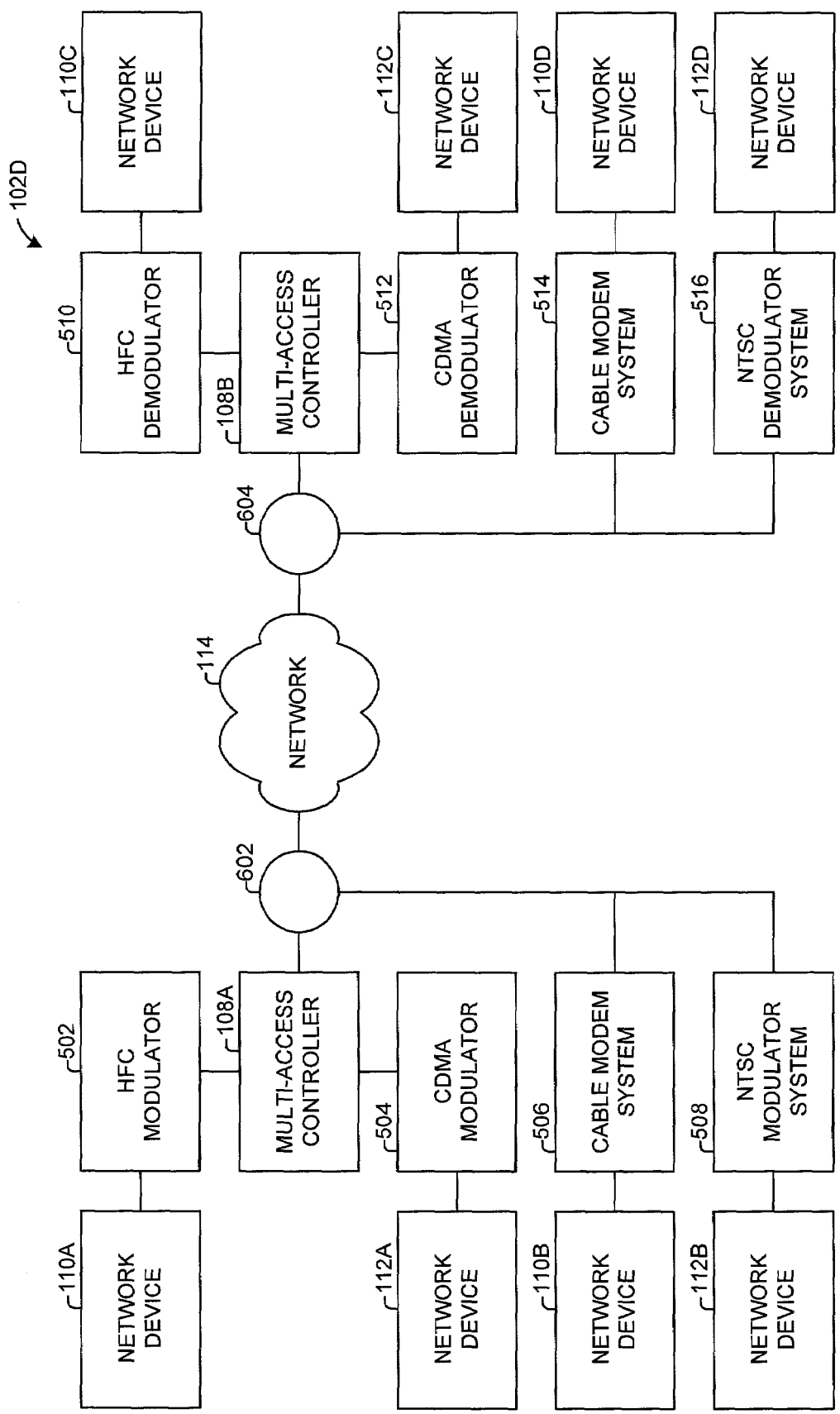
FIG. 6 is a block diagram of a communication system having a coupler and a splitter in accordance with an embodiment of the present invention.

FIG. 6 depicts an exemplary embodiment of a communication system 102D in which the multi-access controller is not integrated with a splitter and/or coupler. In the embodiment of FIG. 6, the communication system 102D comprises a coupler 602 and a splitter 604. The other components of the communication system 102D are the same as those depicted in the embodiment of FIG. 5.

The coupler 602 receives a complementary signal from the multi-access controller 108A and may receive access signals from the cable modem system 506 and/or the NTSC modulator 508. The coupler 602 couples a complementary signal with one or more access signals to create the mixed complementary signal. In one embodiment, this is carried out by mixing the signals. The coupler 602 also is configured to convert the mixed complementary signal to an optical format and to transmit the optical signal using an optical transmitter.

The splitter 604 is configured to split the mixed complementary signal into a complementary signal and one or more access signals. The splitter 604 transmits the complementary signal to the multi-access controller 108B. The splitter 604 transmits an access signal to the cable modem system 514, when the cable modem access signal is present. The splitter 604 transmits an access signal to the NTSC demodulator 516, when the NTSC access signal is present.

Figure 7:
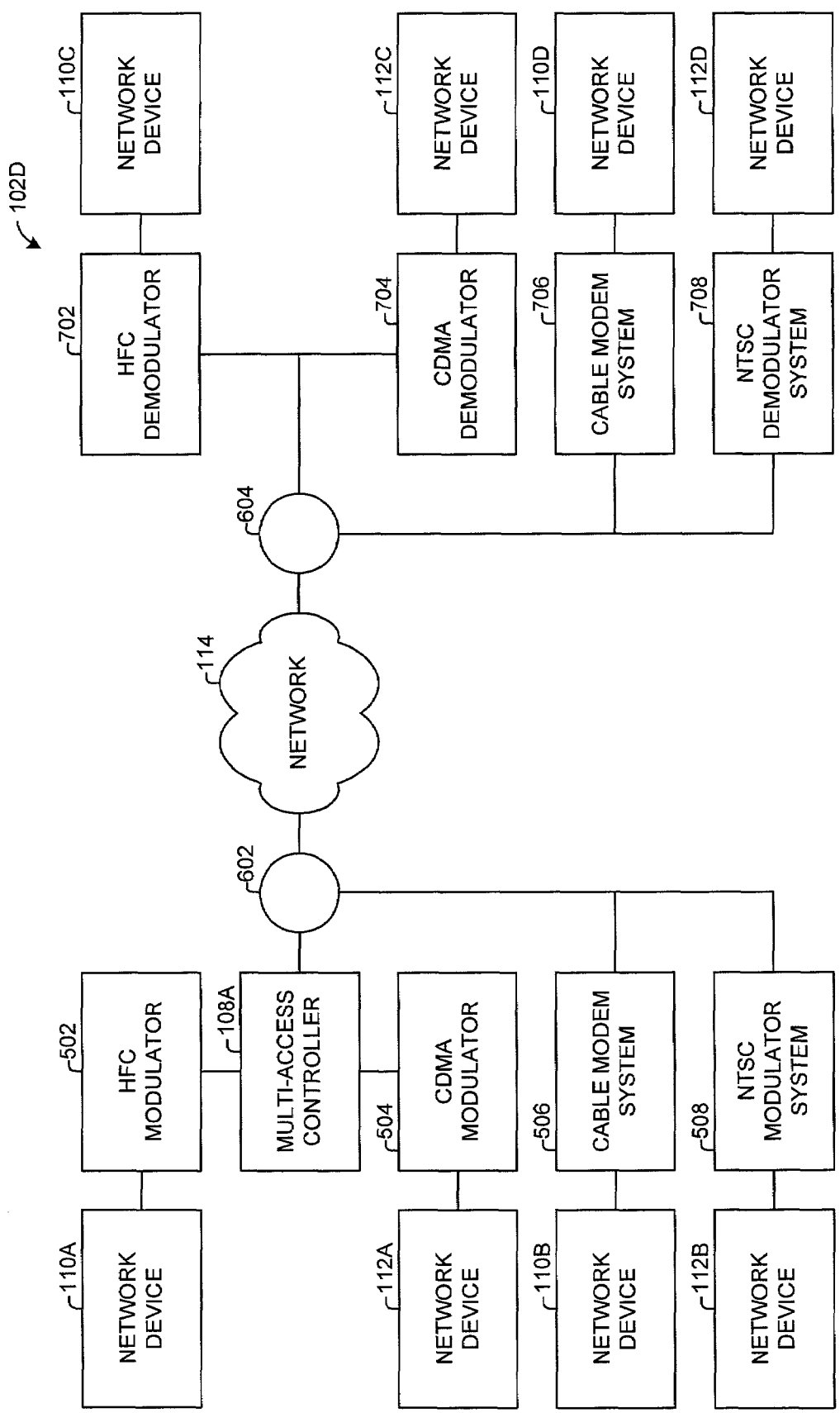
FIG. 7 is a block diagram of a communication system having receivers in accordance with an embodiment of the present invention.

FIG. 7 depicts an exemplary embodiment of a communication system 102D in which the multi-access controller is not integrated with a transmitter on the receive side. In the embodiment of FIG. 7, the communication system 102D comprises an HFC receiver 702, a CDMA receiver 704, a cable modem receiver 706, and an NTSC receiver 708. The other components of the communication system 102D are the same as those depicted in the embodiment of FIG. 6.

The HFC receiver 702 is configured to receive only the portion of a complementary signal that is formatted for protocols used with HFC signals. Thus, the HFC receiver 702 only will receive HFC signals. To be consistent, these signals will be referred to herein as incumbent signals. The HFC receiver 702 receives the incumbent signals and demodulates the incumbent signals or otherwise formats the incumbent signals as needed to be receivable by the network device 110C.

The CDMA receiver 704 is configured to receive only the portion of a complementary signal that is formatted for protocols used with CDMA signals. Thus, the CDMA receiver 704 only will receive CDMA signals. To be consistent, these signals will be referred to herein as overlay signals. The CDMA receiver 704 receives the overlay signals and demodulates the overlay signals or otherwise formats the overlay signals as needed to be receivable by the network device 112C.

The cable modem receiver 706 is configured to receive only the portion of a mixed complementary signal or an access signal that is formatted for protocols used with cable modem signals. Thus, the cable modem receiver 706 only will receive cable modem signals. To be consistent, these signals will be referred to herein as cable modem access signals. The cable modem receiver 706 receives the cable modem access signals and demodulates them, as necessary, or otherwise formats the signals as needed to be receivable by the network device 110D.

The NTSC receiver 708 is configured to receive only the portion of a mixed complementary signal or an access that is formatted for protocols used with NTSC access signals. Thus, the NTSC receiver 708 only will receive NTSC signals. To be consistent, these signals will be referred to herein as NTSC signals. The NTSC receiver 708 receives the NTSC access signals and demodulates them, as necessary, or otherwise formats the signals as needed to be receivable by the network device 112D.

Those skilled in the art will appreciate that variations from the specific embodiments disclosed above are contemplated by the invention. The invention should not be restricted to the above embodiments, but should be measured by the following claims.

What is claimed is:

1. A system for generating a complementary signal comprising:
    an incumbent system configured to format a first signal according to an incumbent protocol;
    an overlay system configured to format a second signal according to an overlay protocol; and
    a controller configured to overlay the first signal with the second signal to create a complementary signal and to transmit the complementary signal as a wireline signal.

2. The system of claim 1 wherein the incumbent system is configured to format the first signal according to a protocol used for an HFC system.

3. The system of claim 1 wherein the incumbent system comprises a modulator configured to modulate the first signal according to a protocol used for a narrowband system.

4. The system of claim 1 wherein the overlay system is configured to format the second signal as a CDMA signal.

5. The system of claim 1 wherein the overlay system comprises a modulator configured to modulate the second signal according to a protocol used for a broadband signal.

6. The system of claim 1 further comprising a network device configured to transmit at least one member of a group consisting of the first signal to the incumbent system and the second signal to the overlay system.

7. The system of claim 1 wherein the incumbent system is configured to process the first signal using at least one member of a group consisting of encryption, de-encryption, compression, decompression, coding, and decoding.

8. The system of claim 1 wherein the overlay system is configured to process the second signal using at least one member of a group consisting of encryption, de-encryption, compression, decompression, coding, and decoding.

9. The system of claim 1 wherein the controller is configured to transmit a control signal to the incumbent system and, in response thereto, the incumbent system is configured to set a transmission level for the first signal.

10. The system of claim 1 wherein the controller is configured to transmit a control signal to the overlay system and, in response thereto, the overlay system is configured to set a transmission level for the second signal.

11. The system of claim 1 wherein:
    the controller is configured to receive an incoming wireline complementary signal and to transmit the incoming wireline complementary signal to the incumbent system and to the overlay system, the wireline complementary signal comprising an incumbent signal portion and an overlay signal portion;
    the incumbent system is configured to demodulate the incumbent signal portion; and
    the overlay system is configured to demodulate the overlay signal portion.

12. The system of claim 11 further comprising a network device wherein the incumbent system comprises a modulator configured to demodulate the incumbent signal portion, to format the demodulated incumbent signal portion to a third signal receivable by the network device, and to transmit the third signal to the network device.

13. The system of claim 11 further comprising a network device wherein the overlay system comprises a modulator configured to demodulate the overlay signal portion, to format the demodulated overlay signal portion to a third signal receivable by the network device, and to transmit the third signal to the network device.

14. The system of claim 11 wherein the controller is configured to process the incoming wireline complementary signal using at least one member of a group consisting of encryption, de-encryption, compression, decompression, coding, and decoding.

15. The system of claim 1 further comprising an access system configured to generate an access signal to the controller wherein the controller is configured to mix the access signal with the complementary signal to result in a mixed complementary signal and, thereafter, to transmit the mixed complementary signal as the wireline signal.

16. The system of claim 1 wherein:
    the system further comprises an access system;
    the controller is configured to receive an incoming wireline complementary signal, to split an access signal from the incoming complementary signal, to transmit the access signal to the access system, and to transmit a remaining incoming wireline complementary signal to the incumbent system and to the overlay system, the remaining wireline complementary signal comprising an incumbent signal portion and an overlay signal portion;
    the incumbent system is configured to demodulate the incumbent signal portion; and the overlay system is configured to demodulate the overlay signal portion.

17. The system of claim 1 wherein:

the system further comprises an access system;

the controller is configured to receive an incoming wireline complementary signal, to transmit the incoming wireline complementary signal to the incumbent system, to the overlay system and to the access system, the wireline complementary signal comprising an incumbent signal portion, an overlay signal portion, and an access signal portion;

the incumbent system is configured to demodulate the incumbent signal portion;

the overlay system is configured to demodulate the overlay signal portion; and the access system is configured to demodulate the access signal portion.

18. The system of claim 1 wherein the controller is configured to dynamically determine at least one complementary transmission level for at least one member of a group consisting of the first signal and the second signal.

19. The system of claim 18 wherein the complementary transmission level comprises at least one member of a group consisting of a power level, a frequency, and a time slot.

20. The system of claim 1 wherein the controller is configured to transmit a first control signal to the incumbent system identifying a first transmission level for the first signal and to transmit a second control signal to the overlay system identifying a second transmission level for the second signal.

21. The system of claim 1 wherein the controller is configured to transmit a first control signal to the incumbent system identifying a first transmission level for a first new signal and to transmit a second control signal to the overlay system identifying a second transmission level for a second new signal.

22. The system of claim 1 further comprising a carrier sensing system configured to dynamically allocate at least one complementary transmission level for the first signal and the second signal.

23. The system of claim 1 further comprising a MAC entity configured to generate at least one control signal to the incumbent system identifying at least one transmission level for the first signal or to the overlay system identifying at least one other transmission level for the second signal.

24. The system of claim 1 further comprising a MAC entity configured to determine a as of the first signal and the second signal and to generate at least one control signal to the incumbent system or the overlay system identifying at least one transmission level for another signal.

25. The system of claim 1 wherein the incumbent system comprises a variable power controller configured to dynamically obtain capacity from the overlay system for transmission of another signal.

26. The system of claim 1 wherein the overlay system comprises a variable power controller configured to dynamically obtain capacity from the incumbent system for transmission of another signal.

27. A system for generating a complementary signal comprising:

an incumbent system configured to format a first signal according to an incumbent protocol at a first transmission level and to generate the formatted first signal as an incumbent signal;

an overlay system configured to format a second signal according to an overlay protocol at a second transmission level and to generate the formatted second signal as an overlay signal;

a controller configured to overlay the incumbent signal with the overlay signal to create a wireline complementary signal and to transmit the wireline complementary signal; and a MAC entity configured to determine the first transmission level for the incumbent signal and the second transmission level for the overlay signal, the first transmission level being complementary to the second transmission level.

28. The system of claim 27 further comprising an access system configured to generate an access signal to the controller wherein the controller is configured to mix the access signal with the wireline complementary signal to result in the wireline complementary signal and, thereafter, to transmit the wireline complementary signal.

29. The system of claim 28 wherein the access signal comprises at least one member of a group consisting of a cable modem signal and an NTSC signal.

30. The system of claim 28 wherein the MAC entity is configured to generate a first control signal to the access system identifying a first transmission level and the access system is configured to generate the access signal at the first transmission level.

31. The system of claim 27 wherein:

the system further comprises an access system;

the controller is configured to receive an incoming wireline complementary signal, to split an access signal from the incoming complementary signal, to transmit the access signal to the access system, and to transmit the incoming wireline complementary signal to the incumbent system and to the overlay system, the wireline complementary signal comprising an incumbent signal portion and an overlay signal portion;

the incumbent system is configured to demodulate the incumbent signal portion; and the overlay system is configured to demodulate the overlay signal portion.

32. The system of claim 27 wherein:

the system further comprises an access system;

the controller is configured to receive an incoming wireline complementary signal, to transmit the incoming wireline complementary signal to the incumbent system, to the overlay system, and to the access system, the wireline complementary signal comprising an incumbent signal portion, an overlay signal portion, and an access signal portion;

the incumbent system is configured to demodulate the incumbent signal portion;

the overlay system is configured to demodulate the overlay signal portion; and the access system is configured to demodulate the access signal portion.

33. The system of claim 27 wherein the MAC entity comprises a first MAC entity configured to determine the first transmission level and a second MAC entity configured to determine the second transmission level.

34. The system of claim 33 wherein the first MAC entity and the second MAC entity are configured to communicate to determine the first transmission level and the second transmission level.

35. The system of claim 33 wherein the first MAC entity is configured to monitor the incumbent system and to process at least one status signal from the second MAC entity to determine the first transmission level.

36. The system of claim 33 wherein the second MAC entity is configured to monitor the overlay system and to process at least one status signal from the first MAC entity to determine the second transmission level.

37. The system of claim 27 wherein the MAC entity is configured to generate a first control signal to the incumbent system identifying the first transmission level and to transmit a second control signal to the overlay system identifying the second transmission level.

38. The system of claim 27 wherein the incumbent system is configured to transmit a first status signal to the MAC entity, the overlay system is configured to transmit a second status signal to the MAC entity, and the MAC entity is configured to determine a third transmission level for at least one member of a group consisting of another incumbent signal and another overlay signal.

39. The system of claim 27 wherein the incumbent system is configured to transmit a first status signal to the MAC entity, the overlay system is configured to transmit a second status signal to the MAC entity, and, in response thereto, the MAC entity is configured to determine at least one member of a group consisting of the first transmission level and the second transmission level.

40. The system of claim 27 wherein the MAC entity is configured to monitor the incumbent system and the overlay system to determine a first status of the incumbent signal and a second status of the overlay signal.

41. The system of claim 27 wherein the incumbent system is configured to modulate the first signal as a narrowband signal, and the overlay system is configured to modulate the second signal as a wideband signal using at least one spreading code.

42. The system of claim 27 wherein the incumbent system comprises an HFC system configured to modulate the first signal according to a protocol used for an HFC signal, and the overlay system comprises a CDMA system configured to modulate the second signal according to a protocol used for a CDMA signal.

43. The system of claim 27 wherein:
the controller is configured to receive an incoming wireline complementary signal and to transmit the incoming wireline complementary signal to the incumbent system and the overlay system, the wireline complementary signal comprising an incumbent signal portion and an overlay signal portion;
the incumbent system is configured to demodulate the incumbent signal portion; and
the overlay system is configured to demodulate the overlay signal portion.

44. The system of claim 43 comprising a first network device and a second network device wherein the MAC entity is configured to determine signal characteristics of the incoming wireline complementary signal, the incumbent system uses the signal characteristics to format the incumbent signal portion to a first format receivable by the first network device, and the overlay system uses the signal characteristics to format the overlay signal portion to a second format receivable by the second network device.

45. The system of claim 44 wherein the signal characteristics comprise at least one member of a group consisting of bandwidth, a spreading code, a modulation scheme, a frequency, a power level, a time slot, a protocol format, encryption, de-encryption, compression, decompression, coding, and decoding.

46. The system of claim 27 wherein the incumbent system is configured to modulate the first signal at a first scheme dynamically identified by the controller, and the overlay system is configured to modulate the second signal at a second scheme dynamically identified by the controller.

47. A system for receiving a complementary signal comprising:
a controller configured to receive a wireline complementary signal and to transmit the wireline complementary signal, the wireline complementary signal comprising an incumbent signal portion and an overlay signal portion;
an incumbent system configured to receive the wireline complementary signal from the controller and to demodulate the incumbent signal portion; and
an overlay system configured to receive the wireline complementary signal from the controller and to demodulate the overlay signal portion.

48. The system of claim 47 wherein the wireline complementary signal further comprises an access signal portion, and the system further comprises an access system configured to receive the wireline complementary signal and to demodulate the access signal portion.

49. The system of claim 47 wherein the wireline complementary signal further comprises an access signal portion, the controller further is configured to split the access signal portion from the wireline complementary signal and to transmit the access signal portion, and the system further comprises an access system configured to receive the access signal portion.

50. The system of claim 47 further comprising a first network device and a second network device wherein the incumbent system is configured to format the demodulated incumbent signal portion to a second signal receivable by the first network device and to transmit the second signal to the first network device and the overlay system is configured to format the demodulated overlay signal portion to a third signal receivable by the second network device and to transmit the third signal to the second network device.

51. The system of claim 47 wherein the incumbent system comprises a modulator configured to demodulate the incumbent signal portion according to a protocol used for an HFC system.

52. The system of claim 47 wherein the overlay system comprises a modulator configured to demodulate the overlay signal portion according to a protocol used for a CDMA system.

53. The system of claim 47 further comprising a first network device, a second network device, and a MAC entity configured to determine signal characteristics of the wireline complementary signal, wherein the incumbent system uses the signal characteristics to format the incumbent signal portion to a first format receivable by the first network device, and the overlay system uses the signal characteristics to format the overlay signal portion to a second format receivable by the second network device.

54. The system of claim 53 wherein the signal characteristics comprise at least one member of a group consisting of bandwidth, a spreading code, a modulation scheme, a frequency, a power level, a time slot, a protocol format, encryption, de-encryption, compression, decompression, coding, and decoding.

55. A method for generating a wireline complementary signal comprising:
formatting a first signal according to an incumbent protocol using an incumbent system;
formatting a second signal according to an overlay protocol using an overlay system;
overlaying the first signal with the second signal using a controller to create the wireline complementary signal; and
transmitting the wireline complementary signal.

56. The method of claim 55 further comprising formatting the first signal according to a protocol used for an HFC system.

57. The method of claim 55 further comprising formatting the second signal as a CDMA signal.

58. The method of claim 55 further comprising transmitting from a network device at least one member of a group consisting of the first signal and the second signal.

59. The method of claim 55 further comprising processing the first signal using at least one member of a group consisting of encryption, de-encryption, compression, decompression, coding, and decoding.

60. The method of claim 55 further comprising processing the second signal using at least one member of a group consisting of encryption, de-encryption, compression, decompression, coding, and decoding.

61. The method of claim 55 further comprising transmitting a control signal from the controller to the incumbent system and, in response thereto, setting a first transmission level for the first signal.

62. The method of claim 55 further comprising transmitting a control signal from the controller to the overlay system and, in response thereto, setting a transmission level for the second signal.

63. The method of claim 55 further comprising:
receiving an incoming wireline complementary signal, the wireline complementary signal comprising an incumbent signal portion and an overlay signal portion;
demodulating the incumbent signal portion using the incumbent system; and
demodulating the overlay signal portion using the overlay system.

64. The method of claim 63 further comprising demodulating the incumbent signal portion according to a protocol used for an HFC system.

65. The method of claim 63 further comprising demodulating the overlay signal portion according to a protocol used for a CDMA system.

66. The method of claim 55 further comprising:
generating an access signal from an access system to the controller; and
mixing the access signal with the wireline complementary signal to result in the wireline complementary signal and, thereafter, transmitting the wireline complementary signal.

67. The method of claim 55 further comprising:
receiving an incoming wireline complementary signal, the incoming wireline complementary signal comprising an incumbent signal portion, an overlay signal portion, and an access signal portion;
splitting the access signal portion from the incoming complementary signal;
transmitting the access signal portion to an access system;
transmitting the incoming wireline complementary signal to the incumbent system and to the overlay system;
demodulating the incumbent signal portion of the incoming complementary signal at the incumbent system; and
demodulating the overlay signal portion of the incoming complementary signal at the overlay system.

68. The method of claim 55 further comprising:
receiving an incoming wireline complementary signal, the incoming wireline complementary signal comprising an incumbent signal portion, an overlay signal portion, and an access signal portion;
transmitting the incoming wireline complementary signal to the incumbent system, to the overlay system, and to an access system;
demodulating the access signal portion of the incoming complementary signal at the access system;
demodulating the incumbent signal portion of the incoming complementary signal at the incumbent system; and
demodulating the overlay signal portion of the incoming complementary signal at the overlay system.

69. The method of claim 55 further comprising determining at least one complementary transmission level for at least one member of a group consisting of the first signal and the second signal.

70. The method of claim 69 further comprising determining for the complementary transmission level at least one member of a group consisting of a power level, a frequency, and a time slot.

71. The method of claim 55 further comprising transmitting a first control signal to the incumbent system identifying a first transmission level for the first signal and transmitting a second control signal to the overlay system identifying a second transmission level for the second signal.

72. The method of claim 55 further comprising transmitting a first control signal to the incumbent system identifying a first transmission level for a first new signal and transmitting a second control signal to the overlay system identifying a second transmission level for a second new signal.

73. The method of claim 55 further comprising dynamically allocating at least one complementary transmission level for the first signal and the second signal using a carrier sensing system.

74. The method of claim 55 further comprising generating from a MAC entity at least one control signal to at least one member of a group consisting of the incumbent system identifying at least one transmission level for the first signal and the overlay system identifying at least one other transmission level for the second signal.

75. The method of claim 55 further comprising determining a status of the first signal and the second signal using a MAC entity and generating at least one control signal identifying at least one transmission level for another signal to at least one member of a group consisting of the incumbent system and the overlay system.

76. The method of claim 55 further comprising dynamically obtaining capacity for the incumbent system from the overlay system for transmission of another signal.

77. The method of claim 55 further comprising dynamically obtaining capacity for the overlay system from the incumbent system for transmission of another signal.

78. A method for generating a complementary signal comprising:
formatting a first signal according to an incumbent protocol at a first transmission level using an incumbent system and generating the formatted first signal as an incumbent signal;
formatting a second signal according to an overlay protocol at a second transmission level using an overlay system and generating the formatted second signal as an overlay signal;

overlaying the incumbent signal with the overlay signal to create a wireline complementary signal using a controller and transmitting the wireline complementary signal; and determining the first transmission level for the incumbent signal and the second transmission level for the overlay signal using a MAC entity, the first transmission level being complementary to the second transmission level.

79. The method of claim 78 further comprising:

generating an access signal from an access system to the controller; and mixing the access signal with the wireline complementary signal to result in the wireline complementary signal and, thereafter, transmitting the wireline complementary signal.

80. The method of claim 79 further comprising generating the access signal as at least one member of a group consisting of a cable modem signal and an NTSC signal.

81. The method of claim 78 further comprising generating a first control signal from the MAC entity to the access system identifying a first transmission level and generating the access signal at the first transmission level from the access system.

82. The method of claim 78 further comprising:

receiving an incoming wireline complementary signal, the incoming wireline complementary signal comprising an incumbent signal portion, an overlay signal portion, and an access signal portion;

splitting the access signal portion from the incoming complementary signal;

transmitting the access signal portion to an access system;

transmitting the incoming wireline complementary signal to the incumbent system and to the overlay system;

demodulating the incumbent signal portion of the incoming complementary signal at the incumbent system; and demodulating the overlay signal portion of the incoming complementary signal at the overlay system.

83. The method of claim 78 further comprising:

receiving an incoming wireline complementary signal, the incoming wireline complementary signal comprising an incumbent signal portion, an overlay signal portion, and an access signal portion;

transmitting the incoming wireline complementary signal to the incumbent system, to the overlay system, and to an access system;

demodulating the access signal portion of the incoming complementary signal at the access system;

demodulating the incumbent signal portion of the incoming complementary signal at the incumbent system; and demodulating the overlay signal portion of the incoming complementary signal at the overlay system.

84. The method of claim 78 further comprising determining the first transmission level with a first MAC entity and determining the second transmission level with a second MAC entity.

85. The method of claim 78 further comprising determining the first transmission level comprising at least one member of a group consisting of a power level, a frequency, and a time slot and determining the second transmission level comprising at least one member of a group consisting of another power level, another frequency, and another time slot.

86. The method of claim 78 further comprising generating a first control signal from the MAC entity to the incumbent system identifying the first transmission level and transmitting a second control signal from the MAC entity to the overlay system identifying the second transmission level.

87. The method of claim 78 further comprising transmitting a first status signal from the incumbent system to the MAC entity, transmitting a second control signal from the overlay system to the MAC entity, and determining a third transmission level at the MAC entity for at least one member of a group consisting of another incumbent signal and another overlay signal.

88. The method of claim 78 further comprising transmitting a first status signal from the incumbent system to the MAC entity, transmitting a second control signal from the overlay system to the MAC entity, and determining a third transmission level at the MAC entity for at least one member of a group consisting of the first transmission level and the second transmission level.

89. The method of claim 78 further comprising modulating the first signal according to a protocol used for an HFC system and modulating the second signal according to a protocol used for a CDMA signal.

90. The method of claim 89 further comprising estimating at the MAC entity at least one incoming transmission level of the incoming wireline complementary signal and identifying the at least one incoming transmission level to the incumbent system and the overlay system.

91. The method of claim 89 further comprising determining signal characteristics of the incoming wireline complementary signal, using the signal characteristics to format the incumbent signal portion to a first format receivable by a first network device, and using the signal characteristics to format the overlay signal portion to a second format receivable by a second network device.

92. The method of claim 91 further comprising determining signal characteristics comprising at least one member of a group consisting of bandwidth, a spreading code, a modulation scheme, a frequency, a power level, a time slot, a protocol format, encryption, de-encryption, compression, decompression, coding, and decoding.

93. The method of claim 78 further comprising modulating the first signal at a first scheme dynamically identified by the controller and modulating the second signal at a second scheme dynamically identified by the controller.

94. A method for receiving a wireline complementary signal comprising:

receiving a wireline complementary signal at a controller and transmitting the wireline complementary signal, the wireline complementary signal comprising an incumbent signal portion and an overlay signal portion;

receiving the wireline complementary signal from the controller at an incumbent system and demodulating the incumbent signal portion; and receiving the wireline complementary signal from the controller at an overlay system and demodulating the overlay signal portion.

95. The method of claim 94 wherein the wireline complementary signal further comprises an access signal portion and the method further comprises receiving the complementary signal at an access system and demodulating the access signal portion.

96. The method of claim 94 wherein the wireline complementary signal further comprises an access signal portion and the method further comprises splitting the access signal portion from the complementary signal at the controller, transmitting the access signal portion, and receiving the access signal portion at an access system.

97. The method of claim 94 further comprising demodulating the incumbent signal portion according to a protocol used for an HFC system.

98. The method of claim 94 further comprising demodulating the overlay signal portion according to a protocol used for a CDMA system.

99. The method of claim 94 further comprising estimating at least one transmission level of the wireline complementary signal using a MAC entity and identifying the at least one transmission level to the incumbent system and the overlay system.

100. The method of claim 94 further comprising determining signal characteristics of the wireline complementary signal using a MAC entity, using the signal characteristics to format the incumbent signal portion to a first format receivable by a first network device, and using the signal characteristics to format the overlay signal portion to a second format receivable by a second network device.

101. The method of claim 100 further comprising determining signal characteristics comprising at least one member of a group consisting of bandwidth, a spreading code, a modulation scheme, a frequency, a power level, a time slot, a protocol format, encryption, de-encryption, compression, coding, and decoding.

* * * * *